US012393923B2

(12) United States Patent
Penney et al.

(10) Patent No.: US 12,393,923 B2
(45) Date of Patent: Aug. 19, 2025

(54) ON-DEMAND SECURE DATA ENTRY FOR REPRESENTATIVE-ASSISTED TRANSACTIONS

(71) Applicant: Broadsource Group Pty Ltd, Docklands (AU)

(72) Inventors: Russell Penney, Brunswick (AU); Haydn Faltyn, Melbourne (AU); Jason Thals, Brunswick (AU)

(73) Assignee: Broadsource Group Pty Ltd, Docklands (AU)

( * ) Notice: Subject to any disclaimer, the term of this patent is extended or adjusted under 35 U.S.C. 154(b) by 42 days.

(21) Appl. No.: 18/436,433

(22) Filed: Feb. 8, 2024

(65) Prior Publication Data

US 2024/0177136 A1    May 30, 2024

Related U.S. Application Data

(63) Continuation-in-part of application No. 18/070,463, filed on Nov. 28, 2022, now Pat. No. 12,136,085.

(60) Provisional application No. 63/405,248, filed on Sep. 9, 2022.

(51) Int. Cl.
*G06Q 20/00* (2012.01)
*G06Q 20/32* (2012.01)
*G06Q 20/38* (2012.01)
*G06Q 20/40* (2012.01)
*H04M 3/42* (2006.01)

(52) U.S. Cl.
CPC ..... *G06Q 20/3255* (2013.01); *G06Q 20/3823* (2013.01); *G06Q 20/401* (2013.01); *H04M 3/42008* (2013.01); *G06Q 2220/00* (2013.01)

(58) Field of Classification Search
CPC ........... G06Q 20/3255; G06Q 20/3823; G06Q 20/401; G06Q 2220/00; G06Q 20/16; G06Q 20/305; G06Q 20/382; H04M 3/42008
USPC .......................... 705/16, 21, 59; 380/44, 262
See application file for complete search history.

(56) References Cited

U.S. PATENT DOCUMENTS

| | | | |
|---|---|---|---|
| 6,256,515 | B1 | 7/2001 | Cox et al. |
| 7,340,048 | B2 | 3/2008 | Stern et al. |
| 8,831,204 | B1 | 9/2014 | Pycko et al. |
| 9,503,584 | B2 | 11/2016 | Defoort |
| 10,176,472 | B1 | 1/2019 | Peterson |
| 10,205,827 | B1 | 2/2019 | Pycko et al. |
| 10,587,753 | B1 | 3/2020 | Ravichandran |

(Continued)

*Primary Examiner* — Dante Ravetti
(74) *Attorney, Agent, or Firm* — Boon Intellectual Property Law, PLLC; Brian S. Boon

(57) ABSTRACT

An on-demand secure data entry system and method for representative-assisted transactions that allows for a representative to be present on a call during the entry of private information to assist the customer while still preventing exposure of the private information to the representative. The system and method involve placing an existing call between a representative and customer on hold, creating a secure call "secure call platform," placing and parking separate calls secured by the secure call platform from the system to the representative and from the system to the customer, transferring the held call to the secure call platform, bridging the separate calls such that the representative and customer are connected through the calls secured by the secure call platform, and then masking portions of information received on the customer-to-system call from information transmitted to the representative-to-system call.

10 Claims, 20 Drawing Sheets

(56) References Cited

U.S. PATENT DOCUMENTS

2008/0069327 A1\* 3/2008 Kingsley ........... H04M 3/42153
  379/201.03
2023/0156125 A1  5/2023 Agarwal et al.

\* cited by examiner

Existing Technology - Inefficient In-Line Payment Processing

Problem:
PCI in-line secure payment systems are highly inefficient, requiring 100% of calls to be monitored when only a small percentage (5-10%) of calls require securing. All calls traverse the telecom provider all the time, with calls being firsts routed into the PCI technology and then re-routed back to the merchant's on-premise switch. This doubles the amount of carriage a merchant needs to purchase from the telecom provider.

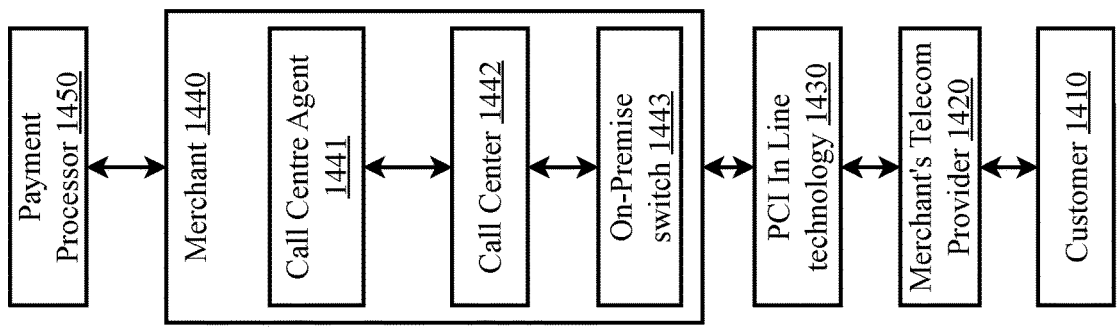

1444 Customers are asked by a call center agent to share their card details when payments are processed which presents a security risk to the business. To reduce this risk, existing PCI technology sits 'in line' between the telecom provider and the on-premise switch to 'listen to' all calls all the time, so that it has visibility of any call which needs to have voiced or DTMF credit card details removed from the call for PCI compliance purposes as a payment is to be made.

1445 The call center at the merchant's facility cannot solve this problem. The merchant must always be on the line with the customer to ensure the sales process and subsequent payment is successful. This system would therefore contain customer card details, unless masked from the merchant environment.

1446 The Merchant switch is inline between the customer and the call center agent and cannot disconnect or the call is lost. All data, including sensitive data, is transmitted through the the switch to the call center; meaning sensitive information is traversing the merchant's IT and voice systems presenting a security risk.

1431 To remove the sensitive information from the call, the PCI technology is installed 'in-line' between the merchant's telecom provider and the merchant environment. It needs to 'listen to' 100% of all calls all the time to ensure it can 'clamps' a call that results in card details being shared (approx. 5-10% of the time). This is extremely inefficient use and significant over capacity and costs are required.

1421 All calls traverse the telecom provider all the time, with the PCI Technology vendor requesting, during the deployment project, for all calls once destined for the merchant's call center to be instead re-routed to the PCI Technology. All calls are routed into this technology first, then re-routed back to the merchant's on-premise switch. This doubles the amount of call volume a merchant needs to purchase from the merchant's telecom provider.

FIG. 14 (PRIOR ART)

Existing Technology - Transfer to External Automated Card Collection Service (IVR) for Payment Processing

Problems a) Transferring the customer to an external payment service removes the security risk, but introduces a risk of dropped calls or having the customer hang up during the payment operation. As the call center agent is no longer on the line to assist customer with the payment, the risk increases the chances that the customer will fail to enter his or her credit card details successfully and hang up.

b) In addition, the call center agent must remain in reserve, waiting for the call to be returned, which is very inefficient.

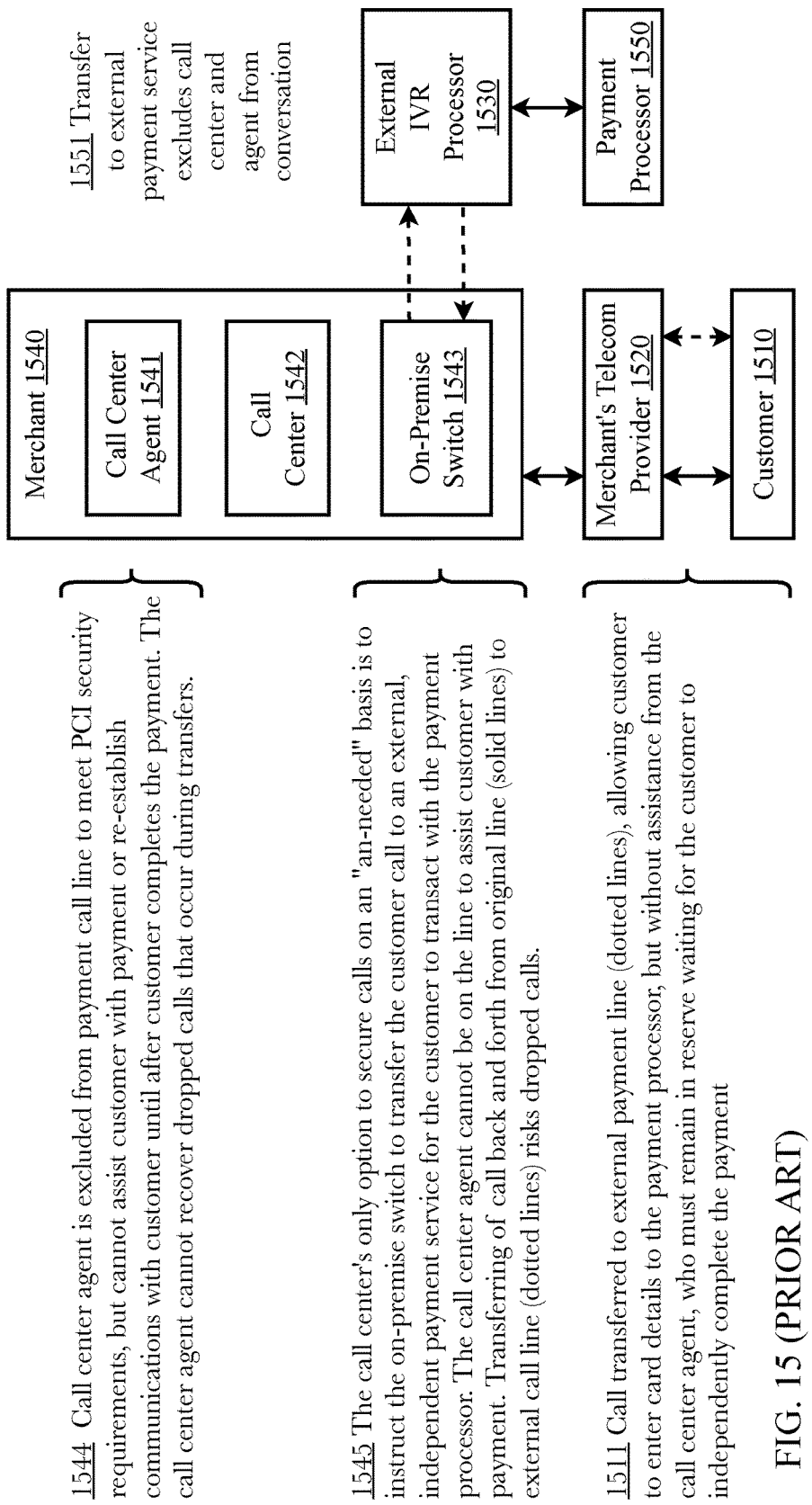

1544 Call center agent is excluded from payment call line to meet PCI security requirements, but cannot assist customer with payment or re-establish communications with customer until after customer completes the payment. The call center agent cannot recover dropped calls that occur during transfers.

1545 The call center's only option to secure calls on an "an-needed" basis is to instruct the on-premise switch to transfer the customer call to an external, independent payment service for the customer to transact with the payment processor. The call center agent cannot be on the line to assist customer with payment. Transferring of call back and forth from original line (solid lines) to external call line (dotted lines) risks dropped calls.

1511 Call transferred to external payment line (dotted lines), allowing customer to enter card details to the payment processor; but without assistance from the call center agent, who must remain in reserve waiting for the customer to independently complete the payment

FIG. 15 (PRIOR ART)

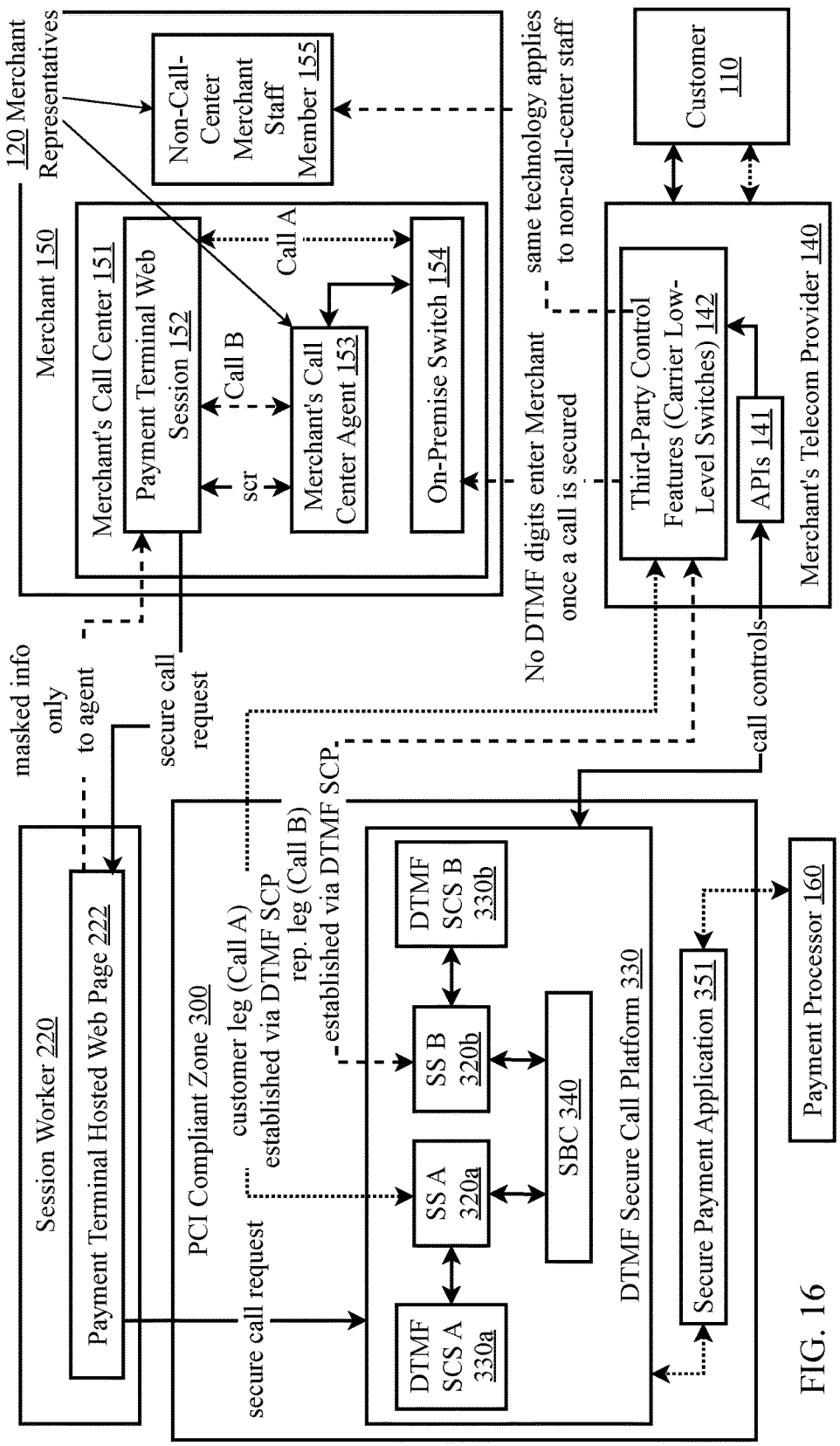

New Technology - Exemplary Use of APIs to Manipulate Telecom Carrier Switches to secure a call. Deployed as a 'peer' to the Telecom Carrier Solution
Deploy a secure call platform as a 'peer' to the telecom carrier, which in turn allows the Merchant to control the telecom carrier's call control APIs to secure a call that contains card details. This allows for payments to be made through a secure Call while keeping merchant, customer, and agent on the call for assistance during payments.

FIG. 16

Exemplary Use Case & Benefits - Just-In-Time Secure Payments for Merchant-Assisted Payments Technology Comparison Table 1710

|  | Contact Center Providers 1711 | DTMF Secure Call Platform (Just-in-Time) 1712 |
|---|---|---|
| Assisted Calls (Live Person Present) 1721 | X | 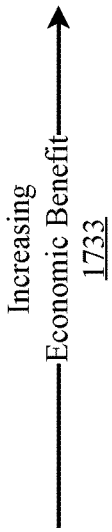 |
| Automated Calls (No Person Present) 1722 | not applicable 1713 | X |

100% of Calls Must Be Routed Through System 1731

Only Calls Requiring Payment Are Routed 1732

Call Routing Efficiency 1730

← Increasing — Economic Benefit → 1733

← Increasing Sales Revenue 1723

Improvements Over Existing Technology 1740

In this exemplary use case, Just-in-Time secure payments are facilitated as a Unified-Communications-as-a-Service (UCaaS), facilitating payments directly between merchants and customers with the following benefits over existing technologies:

1. the call is secured "Just-in-Time" (i.e., only on an as-needed basis without routing all calls through a contact center), and
2. the merchant can remain on the line to assist the customer with the payment.

All existing technologies require either:
1. routing of 100% of call traffic through the contact center, even though only 5%-10% of calls need to be secured for payment (resulting in 90%+ wasted overhead), OR
2. transferring of the calls that need to be secured to an external, automated system (IVR) to have the customer interact with the IVR unassisted while the agent waits unproductively until the call is transferred back (resulting on average in 9% loss of sales and 20% loss in debt recoveries).

FIG. 17

ON-DEMAND SECURE DATA ENTRY FOR REPRESENTATIVE-ASSISTED TRANSACTIONS

CROSS-REFERENCE TO RELATED APPLICATIONS

Priority is claimed in the application data sheet to the following patents or patent applications, each of which is expressly incorporated herein by reference in its entirety:
  Ser. No. 18/070,463
  63/405,248

BACKGROUND

Field of the Art

The disclosure relates to the field of computer data security, and more particularly to the field of secure data entry during representative-assisted transactions.

Discussion of the State of the Art

In the field of representative-assisted calls (e.g., call centers, technical support, retail, hospitality and local government, etc.), data security is an important consideration. One aspect of data security involves representatives having access to the private information of customers such as account numbers, credit card numbers, and passwords. Preventing representatives from seeing or hearing the private information is one way to ensure data security when customers transmit private data during a conversation with a representative.

During phone calls with representatives, for example, it may be necessary for the representative to request private information from a customer for purposes of assisting the customer. Typically, this involves having the customer speak the private information verbally to the representative, which is less secure in that it involves exposing the private information directly to the representative. Where the customer enters the private information using a touchtone phone via dual-tone multi-frequency (DTMF), the representative could hear and decode the tones to obtain the private information. Existing technologies for securing such calls have been restricted in operation to call center environments and require either the entire merchant transaction system to be secured for all calls at all time or require that the customer be transferred to a different system where the representative of the merchant is not present to assist the customer.

What is needed is a means for allowing a representative, whether in a call center or any other telephony environment to be present on a call during the entry of private information to assist the customer while still preventing exposure of the private information to the representative.

SUMMARY

Accordingly, the inventor has conceived and reduced to practice, an on-demand secure data entry system and method for representative-assisted transactions that allows for a representative to be present on a call during the entry of private information to assist the customer while still preventing exposure of the private information to the representative. The system allows for these calls to be secured in both call center and non-call center environments and method involves placing an existing call between a representative and customer on hold, creating a secure call to the "secure call platform," placing and parking separate calls secured by the secure call platform from the system to the representative and from the system to the customer, bridging the separate calls such that the representative and customer are connected through the calls secured by the secure call platform, and then masking portions of information received on the customer-to-system call from information transmitted to the representative-to-system call. In some embodiments, this process is performed via a unified communications (UC) system, Hosted PBX or Cloud VOIP, IMS and Mobile Telephony Networks. In some embodiments, the masked information is dual-tone multi-frequency (DTMF) tones entered by the customer and received on the customer-to-system call.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 14 (PRIOR ART) is a diagram further explaining the limitations of existing in-line payment processing technology for secure call payment solutions.

FIG. 15 (PRIOR ART) is a diagram further explaining the limitations of existing offline automated IVR payment processing technology for secure call payment solutions.

FIG. 16 is a diagram which provides additional context for the on-demand secure data entry system and method for representative-assisted transactions described in FIGS. 1-12.

FIG. 17 is a diagram which describes a primary use case for the on-demand secure data entry system and method for representative-assisted transactions described in FIGS. 1-12.

DETAILED DESCRIPTION

Figure 1:
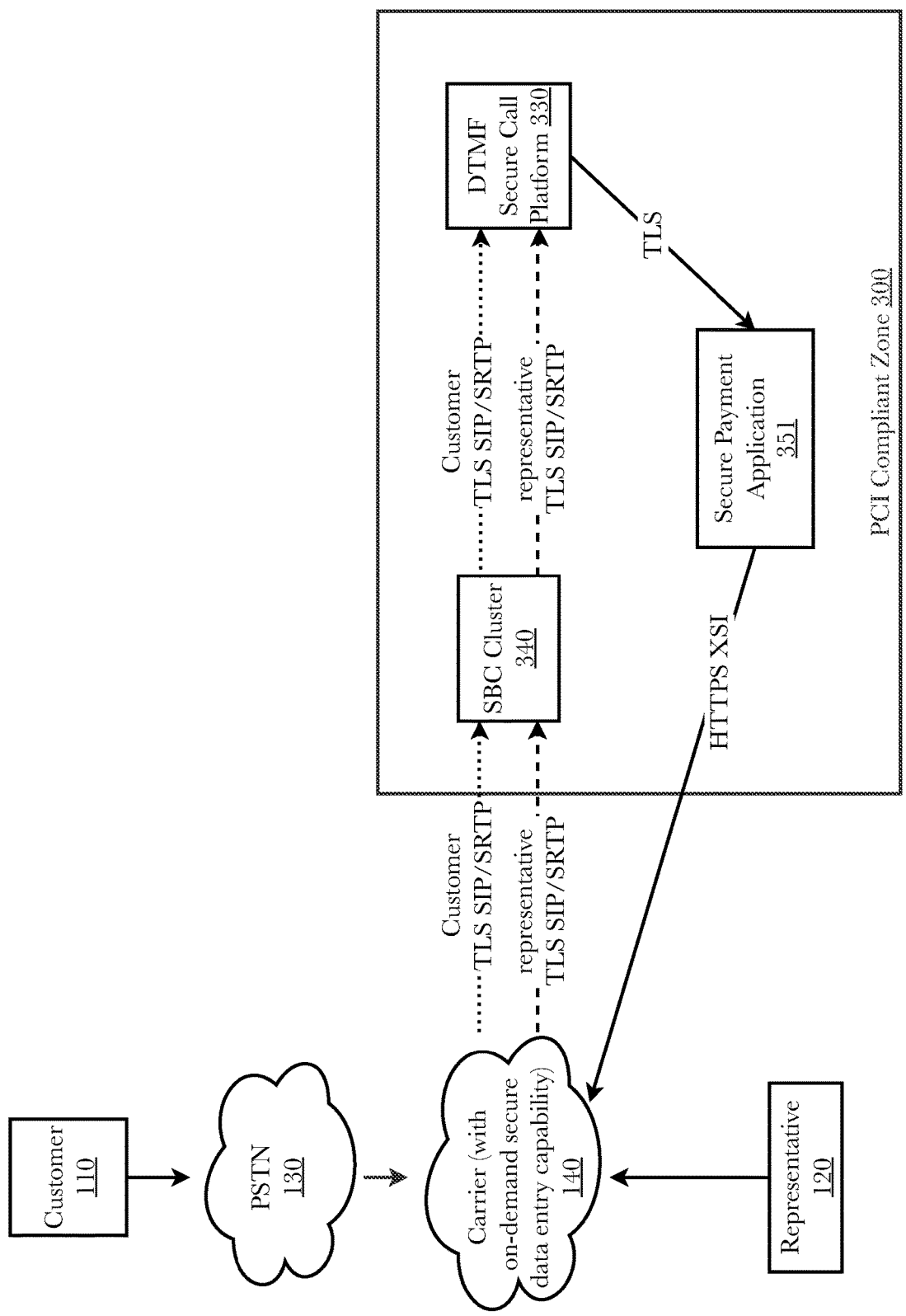
FIG. 1 is a block diagram illustrating exemplary operation of a secure call platform in an payment card industry compliance configuration.

The inventor has conceived, and reduced to practice, an on-demand secure data entry system and method for representative-assisted transactions that allows for a representative to be present on a call during the entry of private information to assist the customer while still preventing exposure of the private information to the representative whether in a call center or any other telephony environment. The system allows for these calls to be secured in both call center and non-call center environments and method involves placing an existing call between a representative and customer on hold, establishing a secure call "secure call platform," placing and parking separate calls secured by the secure call platform from the system to the representative and from the system to the customer, bridging the separate calls such that the representative and customer are connected through the calls secured by the secure call platform, and then masking portions of information received on the customer-to-system call from information transmitted to the representative-to-system call. In some embodiments, this process is performed via a unified communications (UC) systems, Hosted PBX or Cloud VOIP, IMS and Mobile Telephony Networks. In some embodiments, the masked information is dual-tone multi-frequency (DTMF) tones entered by the customer and received on the customer-to-system call.

A primary use case for the secure data entry system and method herein described is for facilitation of customer payments to merchants via a representative of the merchant. It allows for businesses to securely take credit card based payments in different calling environments like a Unified Communications as a Service (UCaaS) extension, Hosted PBX or Cloud VOIP, IMS and Mobile Telephony Networks. This extends secure payments beyond a call center environment to office settings, service desk and retail point of sale transactions where representatives are not always call center staff. UcaaS is the modern form of the modern form of the plain old telephone service (POTS) and allows for software-based call handling as described herein. The application of the system and method herein described allow for new, just-in-time business processes that make customer-merchant transactions scalable to any telephony service and more efficient while simultaneously improving data security. The on-demand secure data entry solution works by moving an existing customer-to-representative call to the "secure call platform." The secure call platform is a software module that secures real-time communication (RTC) connections and, depending on configuration, filters audio and/or data from the connection prior to transmitting it elsewhere. The secure call is established by using third-party call control features in defined steps to place the customer-to-representative call on hold/parked, make a separate representative-to-system call into the PCI compliant zone call of the secure call platform and transfer the held customer-to-representative call into the PCI compliant zone call of the secure call platform, and then connecting those calls internally (e.g., within the secure call platform's PCI compliant zone). After connecting, the customer and representative can talk to each other as usual, but with the added functionality of capturing private information from the customer-to-system leg and masking it from the representative-to-system leg.

As one example, if the customer enters DTMF tones on his or her touchtone keypad, the DTMF audio tones and their decryptions into digits can be received by the system and acted upon (e.g., inserted into appropriate fields) while masking that information from the representative. In some embodiments, once the call is bridged via the secure call platform, it will remain bridged until it ends, although in other embodiments the bridged calls can be disconnected and the original call removed from hold such that the customer and representative continue to converse on the original call.

Using third-party call control is convenient in that it allows the on-demand secure data entry solution to work on most class 5 switches (UcaaS and other cloud, hosted and network telephony software systems and IP Multi-Media Subsystems). Pluggable software interfaces can be used to abstract the switch-dependent integration details.

The on-demand secure data entry solution described herein supports configurable payment gateways (also known as secure payment applications) to allow collection of credit card information along with other details like amount, card holder name and reference, all of which can be submitted to a configurable payment gateway for a representative to perform the card payment using masked or partially-masked information.

In some embodiments, the on-demand secure data entry solution is operated by a representative using a user interface (which enables the representative to secure the call). This user interface can be configured to run on any compatible platform, a non-limiting list of which includes running stand-alone in a browser, embedded in another webpage or application, or displayed on a telephony device with an appropriate screen.

In some embodiments, the on-demand secure data entry solution also supports application programming interfaces (APIs). Use of the on-demand secure data entry solution via APIs allows organisations using the solution to incorporate the securing functionality into their existing systems without major changes to their existing systems.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

A "bridged call" as used herein means any connection of separate calls or call legs such that communication can occur on the bridged call between the participants in the separate calls or call legs. Without limiting the foregoing, a bridged call may create a bridge or connection between the separate calls or call legs while keeping the separate calls or call legs active, may combine the separate calls or call legs into a single new call and disconnect the separate calls or call legs, or may combine the separate calls or call legs into one of the separate calls or call legs while disconnecting the other separate calls or call legs.

"Customer" as used herein means a person requiring assistance via remote communications. A customer may be purchaser or user of the goods and/or services of an organization, but the term as used herein is not so limited, and may include callers seeking assistance from non-profits, helplines, technical support lines, and other sources whether paid or unpaid.

"Payment card industry compliant zone" or "PCI compliant zone" as used herein means a secured computer environment that meets a set of security standards designed to ensure that all entities involved receive, process, store, and transmit credit card information in a secure manner.

"Phone number" as used herein means any sequence of numerical digits that can be dialed by a telephony system in order to connect to a device associated with the sequence of numerical digits dialed. The term "phone number" includes but is not limited to local numbers, national numbers, international numbers, numbers external to a PBX or UC system, and numbers internal to a PBX or UC system, whether or not having an international calling code or country code, a prefix or area code, or a suffix or extension, and whether or not consisting only of a suffix or extension (such as internally to a PBX or UC system).

"Private Branch Exchange" or "PBX" as used herein means a telephone system within an organization that switches calls between users on local lines while enabling all users to share a certain number of external phone lines. Modern PBX systems are capable of converting analog signals from plain old telephone services (POTS) to digital signals, and often include network switching capabilities that allow use of analog phones with the organization's digital PBX system.

"Representative" as used herein means a representative of an organization whose job it is to assist customers via remote communications such as phone, text, or chat. A representative as herein defined includes, but is not limited to, call center agents, salespeople, administrators, receptionists, payment processors, and other persons who may be involved in assisting customers via remote communications, whether paid or unpaid, whether working for an organization receiving payment or for a third party, and regardless of employer-employee relationships.

"Secure call platform" or "SCP" as used herein means a software component that receives and processes softswitch events to secure real-time communication (RTC) connections and, depending on configuration, filter audio and/or data from the connection prior to transmitting it elsewhere.

"Unified Communications" as used herein means integration of different types of communications tools such as PSTN audio calls, VOIP audio calls, video calls, email, voice mail, text messaging.

"Unified Communications Telephony System" or "Unified Communications System" as used herein means a communications system that allows for or provides unified communications.

As used in this application, the phrases "customer-to-representative," "customer-to-system," and "representative-to-system" are not intended to imply a directionality with which the call must be made, but rather to specify the end points of each call leg. Unless otherwise specified herein, the phrase "customer-to-system" may be exchanged for "system-to-customer" and vice-versa, and the phrase "representative-to-system" may be exchanged for "system-to-representative" and vice-versa, and the phrase "representative-to-system" may be exchanged for "system-to-representative" and vice-versa.

DETAILED DESCRIPTION OF DRAWING FIGURES

FIG. 1 is a block diagram illustrating exemplary operation of a secure call platform in an payment card industry compliance configuration. In this example, a customer 110 calls a merchant via a public switching telephone network (PSTN) 130. The customer call is received by a carrier 140 which uses a unified communications (UC) telephony system. A representative 120 is connected to customer's call via carrier 140 at which point customer 110 and representative 120 can converse.

If secure communications are required, for example when representative 120 requests payment information from customer 110 to make a payment for goods or services, representative 120 clicks a button on the screen to secure communications. This starts a process of securing the call via a secure call platform which allows customer 110 to enter data in a secure manner which is masked from representative 120 even while representative remains on the call and available to speak with customer 110. The resultant two calls terminate on an on-demand secure data entry system using carrier's 140 switch or Cloud PBX or UC system, one original call transferred from customer 110 to representative 120, resulting in customer 110 to system 320a and one call from representative 120 to system via carrier 140. The calls are passed as session initiation protocol (SIP) calls to a session border controller (SBC) 340 residing within a payment card industry (PCI) compliant zone 300. SBC passes the calls to a DTMF secure call platform 330, which secures the calls, connects them, and masks DTMF tones and decryptions entered by customer 110 from representative 120 while passing through other audio to representative 120, allowing customer 110 and representative 120 to continue conversing while customer enters DTMF tones (e.g., credit card numbers). Data entered by customer 110 using DTMF tones may be displayed to representative in masked or partially masked form (e.g., with asterisks in place of some or all of the decrypted DTMF digits). After customer's data has been entered, representative may submit the information for payment to a secure payment application 351 which places the payment via an Internet connection through secure payment application 351.

Note that while the customer call is shown in this example as being placed on a regular phone line via a PSTN, no limitation is implied thereby, and the call may be placed through other available means or technologies (e.g., voice-over-Internet-protocol (VOIP), cellular phone service, etc.).

Figure 2:
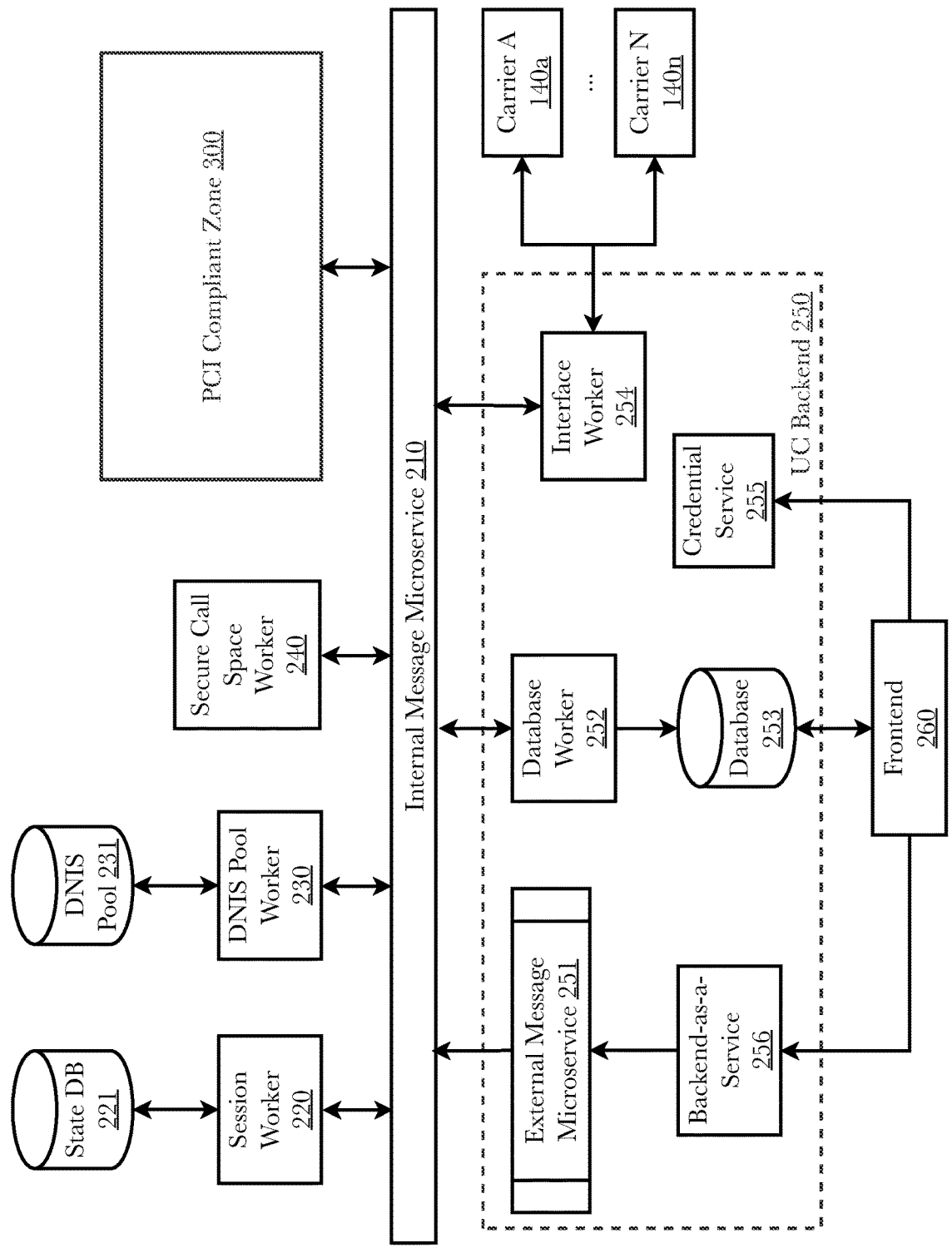
FIG. 2 is a block diagram illustrating an exemplary system architecture for a on-demand secure data entry system.

FIG. 2 is a block diagram illustrating an exemplary system architecture for an on-demand secure data entry system. In this embodiment, the backbone of the system is an internal messaging microservice 210 through which are passed messages from various workers, each having functionality that implements a portion of the system and directs and controls other components of the system. Internal messaging microservice 210 can be managed by one of several available messaging brokers such as Rabbit MQ™. The various workers comprise a session worker 220 a dialed number identification service (DNIS) worker 230, a secure call platform worker 240, a database worker 252, and an interface worker 257.

Session worker 220 is responsible for management of the overall process of receiving an original call, placing it on hold, establishing a connection with the secure call platform, placing new calls, and bridging the new calls. Service worker 220 may store information about the state of the process in a state database 221.

DNIS pool worker 230 is responsible for making dialed number identification service (DNIS) allocations for incoming calls, thereby allowing an organization's PBX or UC system to identify the number to which a call is being made to the secure call platform and any DTMF tones associated with that number for use in capturing data. DNIS pool worker 230 may have access to a DNIS pool database 231 which stores a list of numbers dialable from the organization for whom the representative is working.

Secure call platform worker 240 is responsible for management of secure call platforms to secure calls, bridge calls, and mask private information received such as private information in the form of DTMF tones.

A unified communications (UC) backend 250 implements calls and call management instructions from session worker 220, DNIS pool worker 230, and secure call platform worker 240. UC backend 250 of this embodiment comprises an external message microservice 251, a database worker 252, a database 253, an interface worker 254, cloud functionality 256, and a credential service 255. External message microservice 251 operates in a manner similar to internal message microservice 210, but for messages with external entities or services. External message microservice 251 can be managed by one of several available messaging brokers such as Rabbit MQ™. Database worker 252 manages a cloud-based database service 253 used to store information such as user profiles, telephony information, and payment gateway information. An example of a cloud-based database service manageable by database worker 252 is Google Firestore™ or equivalent Amazon Web Service (AWS) technologies. Backend-as-a-service 256 provides cloud-based, scalable, cross-platform backend services via application programming interfaces (APIs) such as database management, cloud storage, user authentication, push notifications, and web hosting. Interface worker 254 receives and places calls through various carriers 140a-n pursuant to instructions from session worker 220.

A frontend 260 provides representatives with an interface for accessing and using the system, including an interface for implementing secure call platforms during a call.

In operation, when representative 120 asks for a call to be secured, DNIS pool worker 230 temporarily allocates a number from a DNIS pool 231. Session worker 220 then directs both the customer leg and the representative leg via the allocated number to a softswitch instance managed by interface worker 254. After validation and securing of the customer leg and representative leg calls, the calls are bridged allowing customer and representative to speak while intercepting and masking from representative any DTMF tones entered by customer.

DNIS pool 231 is a list of phone numbers that are dialable from the representative's phone service. They can be full national numbers or internal extensions. They can be routable internally via a softswitch on the merchant's telecom provider's end or via the PSTN 130. In order to bridge the call legs, the number presented to the softswitch should be the same as the number used to dial the call to the secure call platform for each leg. The number presented to the softswitch is used to confirm that the number allocated from DNIS pool is correct and active, and to bridge the two call legs in a session. This procedure may be modified in cases where there is a routing prefix required to get the call out of a trunk line to the secure call platform. Each organization using the on-demand secure data entry system would likely have its own pool of numbers.

DNIS pool 231 acts as a security measure in that only numbers from the pool will be recognized by the system as valid. In some embodiments, the quantity of numbers available in the DNIS pool 231 may be dependent on the call volume of the organization and the security level needed. A larger DNIS pool 231 or a DNIS pool 231 containing randomly-selected numbers is more secure because attackers will have to guess more digits of the number (e.g., when the pool contains numbers with different prefixes versus numbers with the same prefix) so has a smaller chance of being able to dial a number in the pool which would be recognized as a valid call. If the numbers are not dialable externally then that also increases the security as they cannot be obtained outside of the system, and may allow a smaller quantity of numbers to be used with equivalent security.

Random allocation of numbers from DNIS pool 231 will enhance security. A further security enhancement is setting a time limit on the validity of the number selected from the pool, after which that number will no longer be recognized as valid. This allows a finite set of numbers to be used and re-used while still providing an acceptable level of security. Ideally, the amount of time a number can be allocated for should be the shortest time needed to reliably connect both customer and representative calls to the secure call platform. If a call comes in with a valid number but after the expiration of the time limit, the call may be rejected, and an alarm may be raised. Using these procedures would require an attacker to guess a number from the pool and dial it within the time limit in order to join a call either as customer or representative. In either case, however, this could not cause a PCI breach as the attacker would either replace the customer (in which case the customer's private information is not available) or would replace the representative (in which case the DTMF tones from the customer would be masked).

Once a number has been selected from DNIS pool 231, a series of instructions are orchestrated by the session worker 220 to establish a secured, bridged call between customer and representative as further described below.

Figure 3:
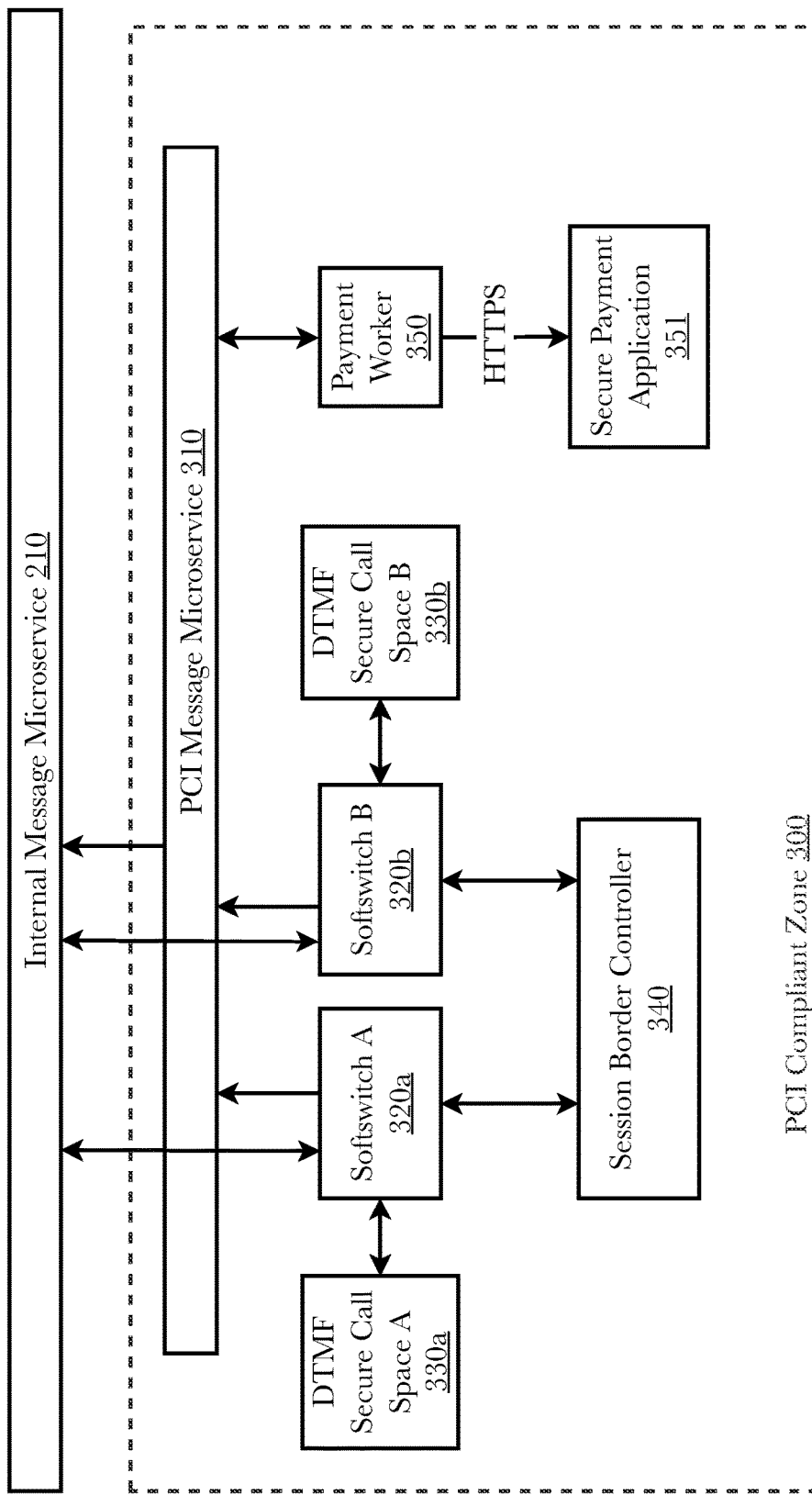
FIG. 3 is a block diagram illustrating details of exemplary payment card industry compliance zone aspect of an on-demand secure data entry system.

FIG. 3 is a block diagram illustrating details of exemplary payment card industry compliance zone aspect of an on-demand secure data entry system. When representative 120 requests that a call be secured, session worker 220 directs customer-to-system and representative-to-system calls to be made via softswitches 320a, b within a payment card industry (PCI) compliant zone. A PCI compliant zone is one that meets a set of security standards designed to ensure that all entities involved receive, process, store, and transmit credit card information in a secure environment. The operation of PCI compliant zone 300 is handled through a PCI message microservice 310 which operates in a manner similar to internal message microservice 210, but for messages within PCI compliant zone 300. PCI message microservice 310 can be managed by one of several available messaging brokers such as Rabbit MQ™. When calls are secured in a secure call platform and bridged messages are passed to PCI message microservice 310 to notify session worker 220 of their status. As used in this application, the phrases "customer-to-representative," "customer-to-system," and "representative-to-system" are not intended to imply a directionality with which the call must be made, but rather to specify the end points of each call leg. Unless otherwise specified herein, the phrase "customer-to-system" may be exchanged for "system-to-customer" and vice-versa, and the phrase "representative-to-system" may be exchanged for "system-to-representative" and vice-versa, and the phrase "representative-to-system" may be exchanged for "system-to-representative" and vice-versa.

Session worker 220 directs UC backend 250 to place the existing customer-to-representative call on hold. Once the existing call has been placed on hold, session worker 220 directly UC backend 250 to establish a customer-to-system call (call A) through softswitch A 320a for which a DMTF secure call space A is established 330a. Once call A has been established and parked, session worker 220 then directs UC backend 250 to establish a representative-to-system call (call B) through softswitch B 320b for which a DMTF secure call platform B is established 330b. Once call B has been established and parked, session worker 220 directs UC backend to bridge call A and call B to re-establish communications between customer and representative wherein voice audio is passed between customer and representative, but any DTMF tones entered by customer are masked from representative.

Session Border Controller (SBC) 340 is responsible for securing VOIP calls within PCI compliant zone 300 border and for directing telephony sessions from carriers to the appropriate softswitches for securing and bridging.

After secured, bridged calls have been established and customer has entered payment information via DTMF, payment worker 350 receives payment information fields from DTMF secure call platform via PCI message microservice 310 to process payments requested by representative. Payment worker 350 processes the payment via a secure payment application 351 via an Internet connection.

Figure 4A:
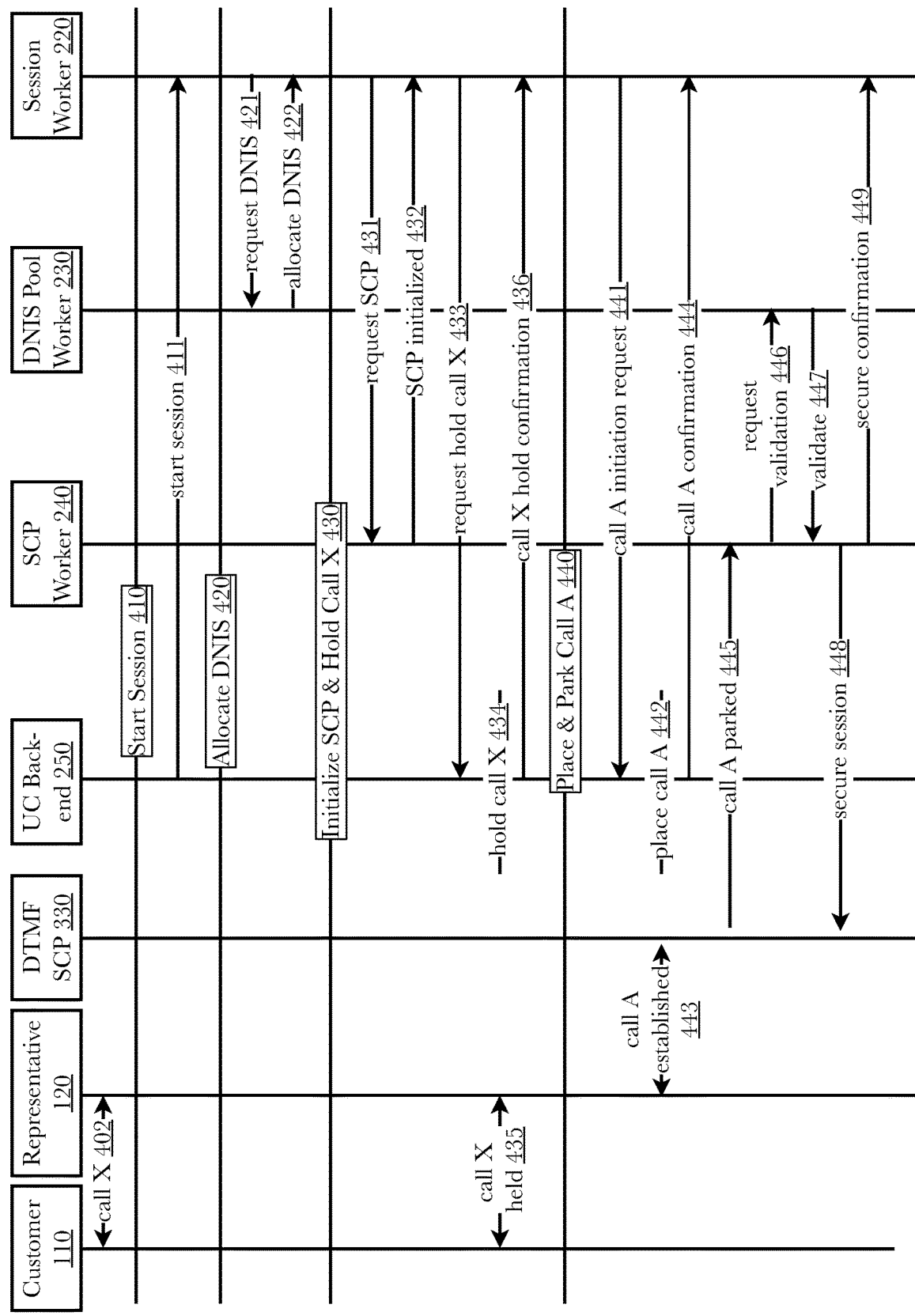
FIGS. 4A & 4B are a messaging diagram illustrating an exemplary messaging sequence for establishing a secured call space bridged call for secure data entry.
Figure 4B:
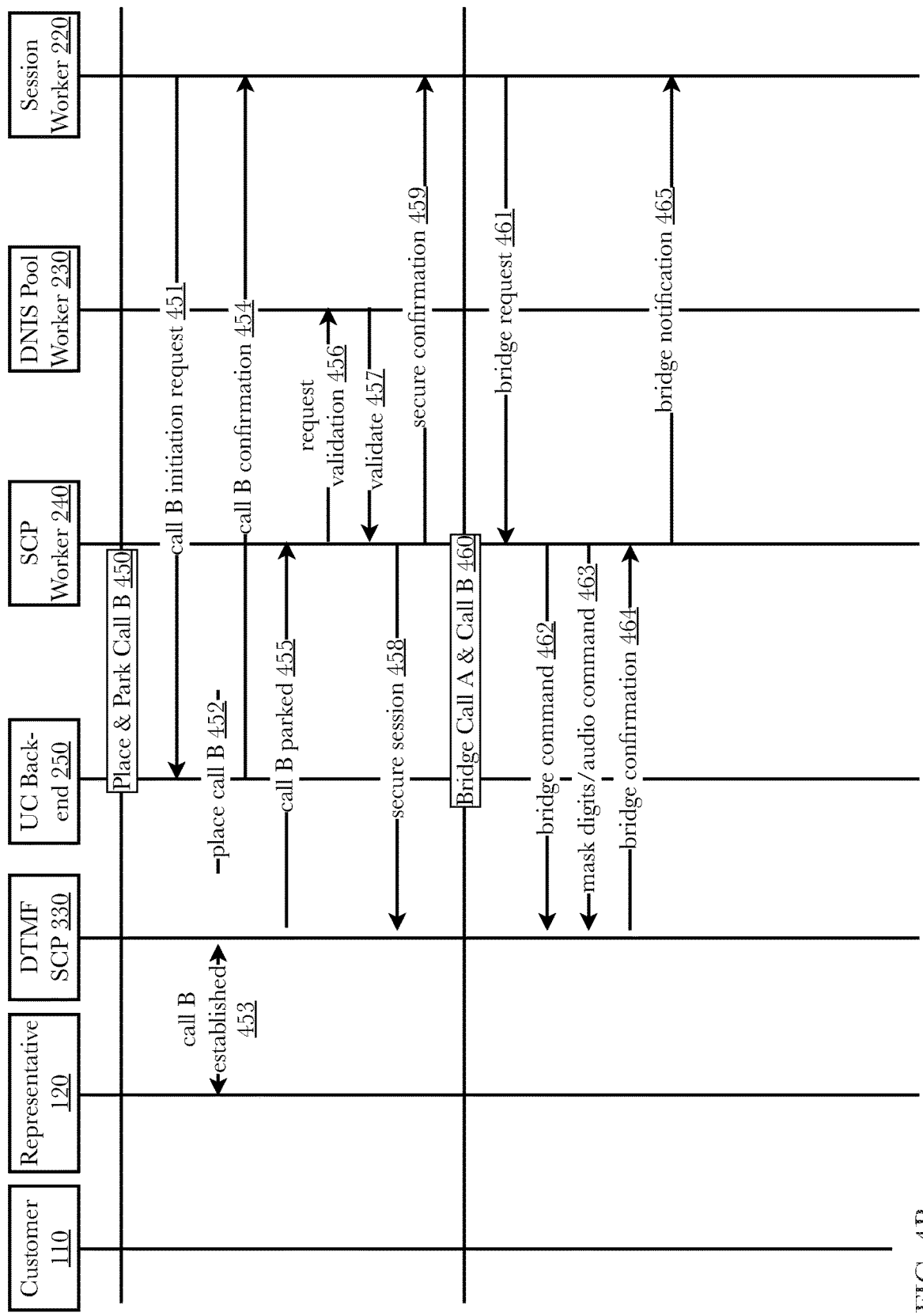

FIGS. 4A & 4B are a messaging diagram illustrating an exemplary messaging sequence for establishing a secured, bridged call for secure data entry. During a customer call (call X) with a representative 402, representative initiates a secure data entry session via his or her interface (e.g., by clicking on a "secure connection" button or equivalent automated instigation from another representative application interface). A new session is started 410 when the UC backend 250 directs session worker 220 to start a session 411. A DNIS number is allocated 420 when session worker 220 requests a DNIS allocation 421 from DNIS pool worker 230, which responds by allocating a DNIS number 422. A secure call platform is initialized and call X (Customer) is placed on hold 430 when session worker 220 requests establishment of a secure call platform 431 from secure call platform worker 240, which sends confirmation of secure call platform initialization 432 to session worker 220. Session worker 220 then sends a request to UC backend 250 to place call X on hold 433. Call X is held 435 when placed on hold 434 by UC backend 250, which then sends a hold confirmation 436 to session worker 220. Representative-to-system call (call A) is placed and parked 440 when session worker 220 sends a call initiation request 441 to UC backend 250. Call A is established 443 between DTMF secure call platform 330 and representative 120 when the call is placed by UC backend 442, which sends confirmation of the call A placement 444 to session worker 220. DTMF secure call platform parks call A and sends notification that call A is parked 445 to secure call platform worker 240. Secure call platform worker 240 requests validation of call A 446 from DNIS pool worker 230, which responds by sending a validation 447 to secure call platform worker 240. Secure call platform worker 240 secures the session 448 via DTMF secure call platform 330 and sends a confirmation that the session has been secured 449 to session worker 220. Customer-to-system call (call B) is placed and parked 450 when session worker 220 sends a call initiation request 451 to UC backend 250. Call B is established 453 between DTMF secure call platform 330 and representative 120 when the call is placed by UC backend 452, which sends confirmation of the call B placement 454 to session worker 220. DTMF secure call platform parks call B and sends notification that call B is parked 455 to secure call platform worker 240. Secure call platform worker 240 requests validation of call B 456 from DNIS pool worker 230, which responds by sending a validation 457 to secure call platform worker 240. Secure call platform worker 240 secures the session 458 via DTMF secure call platform 330 and sends a confirmation that the session has been secured 459 to session worker 220. Call A and call B are bridged 460 when session worker 220 sends a bridge request 461 to secure call platform worker 240, which sends a bridge command 462 and a mask digits/mask audio command 463 to DTMF secure call platform 330. DTMF secure call platform 330 responds with a bridge confirmation 464 and secure call platform worker 240 sends a notification of the bridge 465 to session worker 220.

Figure 5:
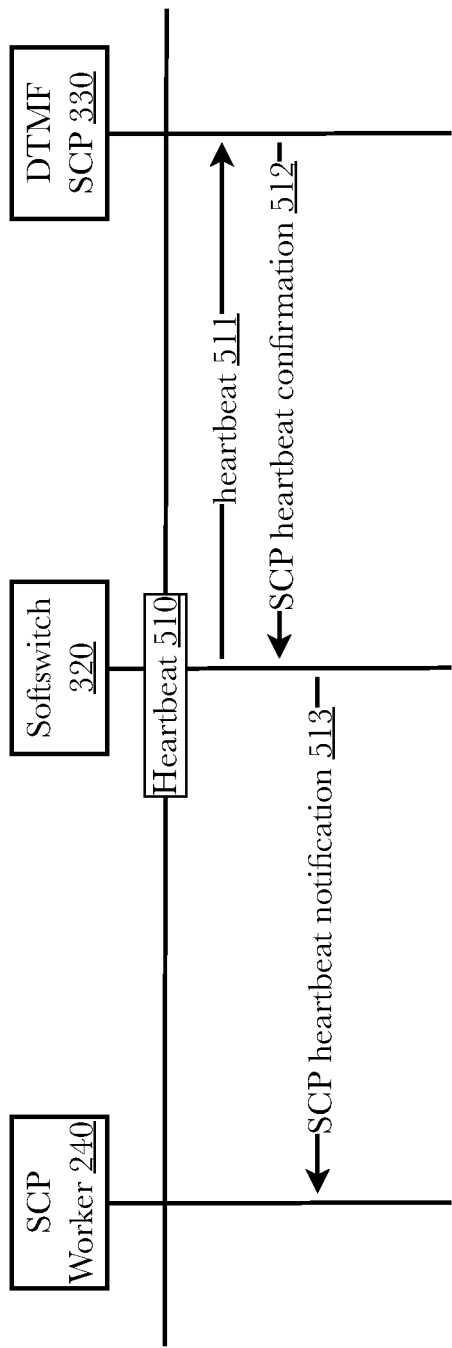
FIG. 5 is a messaging diagram illustrating an exemplary messaging sequence for confirming a state of a secure call platform for a secure data entry system.

FIG. 5 is a messaging diagram illustrating an exemplary messaging sequence for confirming a state of a secure call platform for a secure data entry system. A heartbeat confirmation sequence 510 is initiated during each heartbeat of a server operating a softswitch 320. Softswitch 320 sends a heartbeat event 511 to DTMF secure call platform 330, which responds by confirming the state of the secure call platform during that heartbeat 512. Softswitch 320 sends a secure call platform heartbeat notification 513 to secure call platform worker 240.

Figure 6:
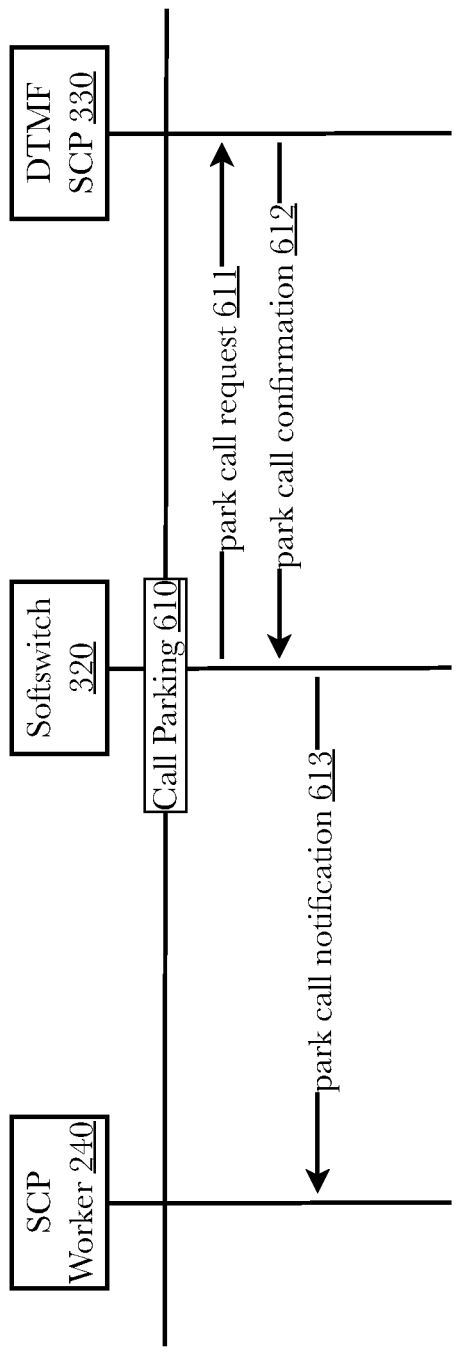
FIG. 6 is a messaging diagram illustrating an exemplary messaging sequence for parking a call prior to bridging calls for a secure data entry system.

FIG. 6 is a messaging diagram illustrating an exemplary messaging sequence for parking a call prior to bridging calls for a secure data entry system. A call parking sequence 610 is initiated when softswitch 320 sends a park call event 611 to DTMF secure call platform 330, which responds by parking the call and sending a parked call confirmation to softswitch 612. Softswitch 320 sends a parked call notification 613 to secure call platform worker 240.

Figure 7:
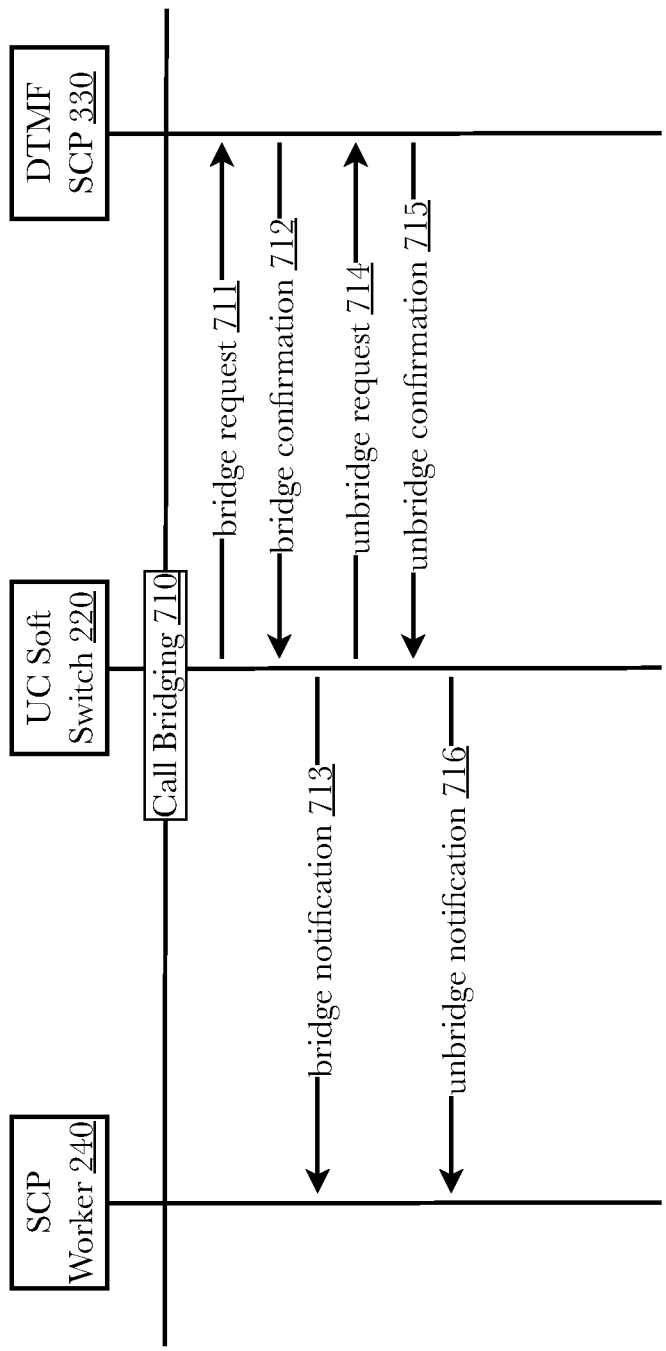
FIG. 7 is a messaging diagram illustrating an exemplary messaging sequence for bridging calls for a secure data entry system.

FIG. 7 is a messaging diagram illustrating an exemplary messaging sequence for bridging calls for a secure data entry system. A call bridging sequence 710 is initiated when softswitch 320 sends a bridge request 711 to DTMF secure call platform 330, which responds by bridging the call and sending a bridged call confirmation 712 to softswitch 320. Softswitch 320 sends a bridged call notification 713 to secure call platform worker 240. Likewise, a call unbridging sequence is initiated when softswitch 320 sends an unbridge request 714 to DTMF secure call platform 330, which responds by bridging the call and sending a bridged call confirmation 715 to softswitch 320. Softswitch 320 sends a bridged call notification 716 to secure call platform worker 240.

Figure 8:
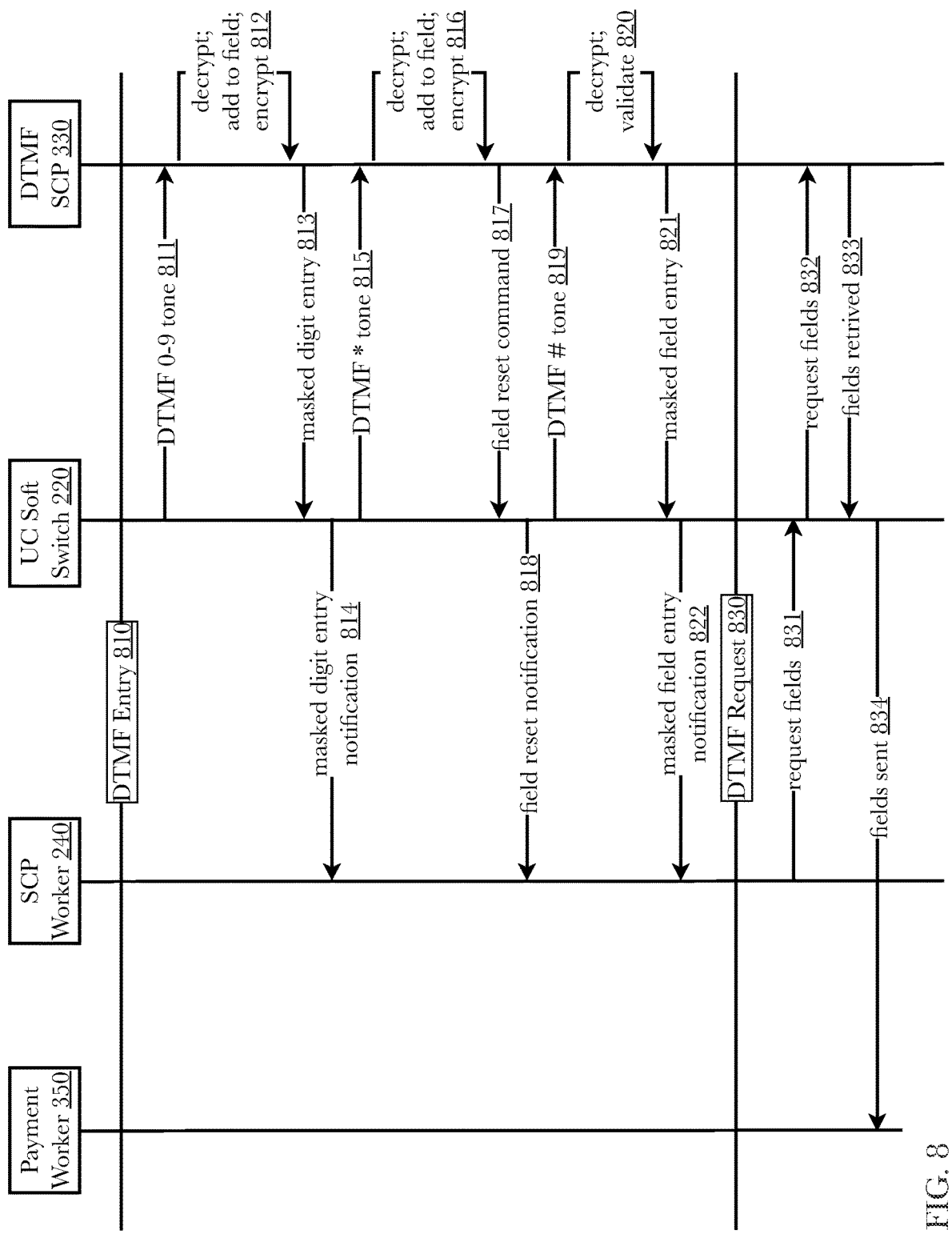
FIG. 8 is a messaging diagram illustrating an exemplary messaging sequence for secure processing of DTMF tones for a secure data entry system.

FIG. 8 is a messaging diagram illustrating an exemplary messaging sequence for secure processing of DTMF tones for a secure data entry system. A DTMF entry sequence 810 is initiated when softswitch 320 sends a DMTF tone 811 to DTMF secure call platform 330, which decrypts the tone into a digit, adds the digit to a field, and encrypts the field 812, sending a masked digit entry 813 to softswitch 320. Softswitch 320 sends a masked digit entry notification 814 to secure call platform worker 240.

If the DTMF tone is the "*" tone 815, DTMF secure call platform 330 decrypts the tone, empties the field, and encrypts the field 816, and sends a field reset command 817 to softswitch 320. Softswitch 320 sends a field reset notification 818 to secure call platform worker 240.

If the DTMF tone is the "#" tone 819, DTMF secure call platform 330 decrypts the tone, validates the field 820, and sends a masked field entry 821 to softswitch 320. Softswitch 320 sends a masked field entry notification 822 to secure call platform worker 240.

A DTMF request sequence 830 is initiated when secure call platform worker 240, upon receipt of the masked field entry notification 822, sends requests fields 831 to softswitch 320, which in turn requests fields 832 from DTMF secure call platform 330. DTMF secure call platform 330 retrieves the fields and sends them 833 to softswitch 320 which sends the fields 834 to secure call platform worker 240.

Figure 9:
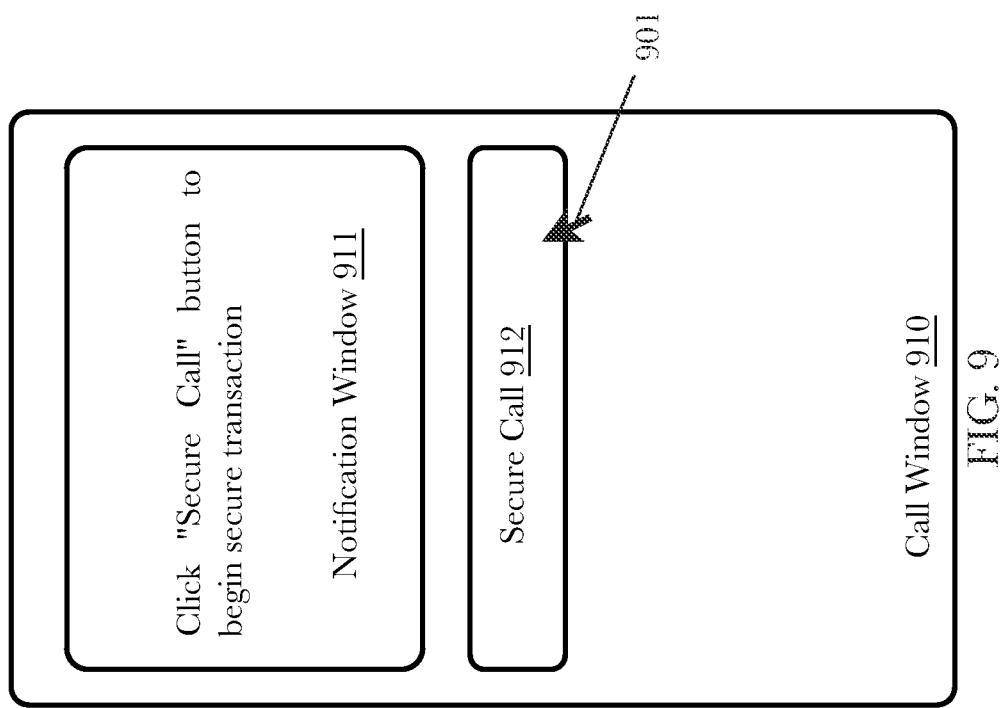
FIGS. 9-12 are exemplary screenshots showing a representative's interface during a secure data entry session.
Figure 10:
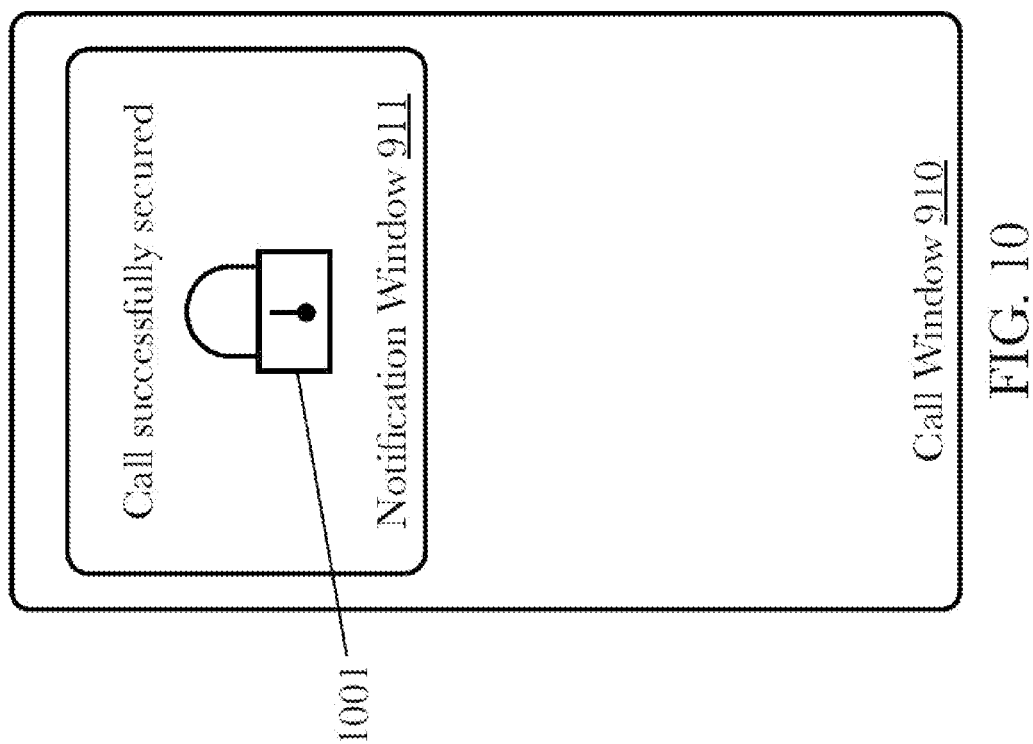
Figure 11:
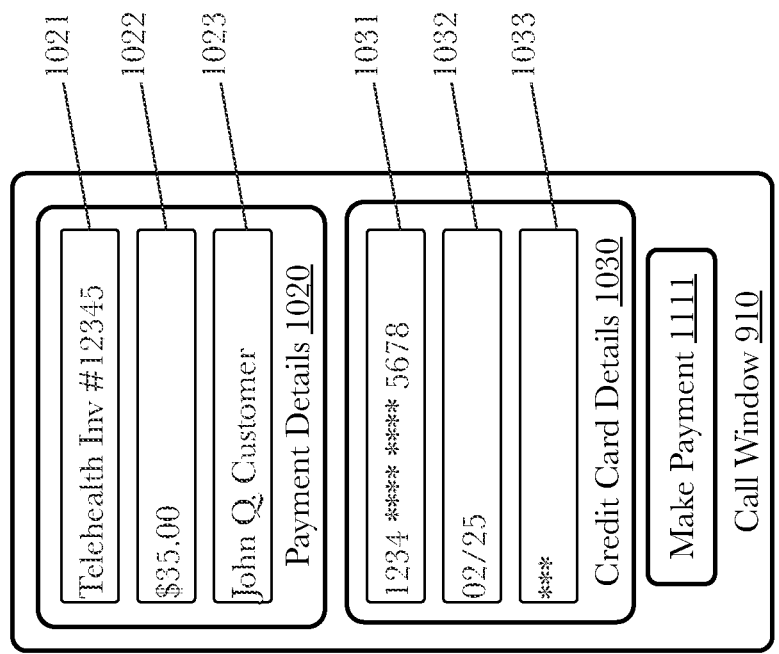
Figure 12:
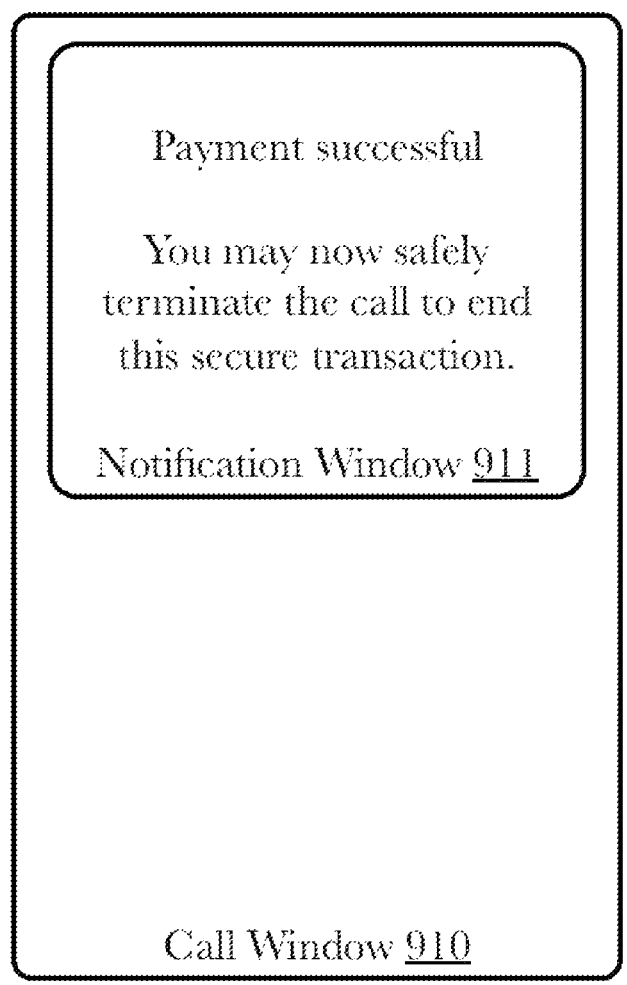

FIGS. 9-12 are exemplary screenshots showing a representative's interface during a secure data entry session. In FIG. 9, the call window 910 seen by the representative shows a notification window 911 which instructs the representative to click on a "secure call" button 912 to begin a secure transaction. When the representative clicks on the secure call button 912 using a pointer 901, the call is secured via a secured, bridged call as described above. In FIG. 10, the notification window now displays a 1001 a message to the representative that the call has been successfully secured. In FIG. 11, the call window now displays a payment details window 1020, a credit card details window 1030, and a 'make payment button' 1111. The representative fills in the payment details fields comprising a transaction description 1021, an amount 1022, and the name of the customer 1023 while the customer is still on the phone. At this point, the representative requests that the customer enter DTMF tones on his or her touchtone keypad for each of the indicated fields, in this example a credit card number field 1031, an expiration date field 1032, and a card verification value (CCV) field 1033. As the customer enters the DTMF tones for each digit, the system intercepts the tones, decrypts them, and enters them into the fields 1031-1033 masked by asterisks so that the representative neither hears the tones nor sees the masked digits (in this example not all of the digits are masked). When the credit card details fields 1031-1033 are completed, the representative clicks on the make payment button 1111, and the system processes the payment through a secure payment application 351. FIG. 12 shows the completion of the secure data entry process with the notification window 911 advising the representative that the payment was successful and that the call can be safely terminated, if appropriate.

Figure 13:
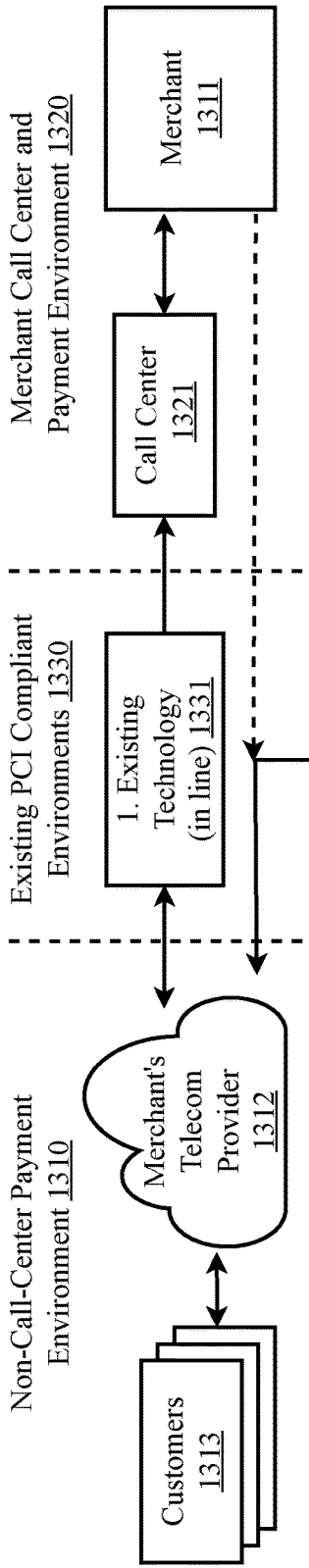
FIG. 13 (PRIOR ART) is a diagram explaining the limitations of the two existing technologies for secure call payment solutions employed in call centers.

FIG. 13 (PRIOR ART) is a diagram explaining the limitations of the two existing technologies for secure call payment solutions employed in call centers. Their methods of 'in-line' and 'external IVR' payment processing are well suited to concentrated calling environments, but limits their application for highly distributed telephony architectures employed in Retail, Local Government and Health sectors. They are the existing call center approaches of in-line payment processing and external IVR systems. There are no existing technologies 1330 for secure payments made by customers who call a representative who is using a telephone outside of a controlled call center environment. Inline secure payment systems 1331 and offline automated IVR payment systems 1332 are technically and economically constrained to a call center environments where there is a high concentration of customer calls into a small number of centralized locations. Both of these technologies have problems that are solved by the secure payment system described in FIGS. 1-12. There are currently no secure payment solutions which allow merchant staff who are not call center representatives to take secure payments (e.g., a retail shop front staff member taking a deposit payment, via their UCaaS phone service, to put stock aside for a customer).

Further, there are currently no secure payment solutions which allow merchant representatives to secure an unsecured call on demand while staying on the line.

In both existing technologies customers 1313 1310 call merchants 1311 via the merchants' telecommunications providers 1312. While the merchants 1311 may have call center capabilities 1321 (provided as a premise or cloud-based service to the merchant), the secure payment capabilities of the call center environment 1321 are only available. The two existing technologies 1330 for handling these non-call-center payment situations have substantial technological and/or economic drawbacks and cannot provide secure call payments in some circumstances.

Inline call securing technologies are only suited to work in highly concentrated calling environments of call center environments. They require securing of all calls going to the merchant to make sure that those call that could contain a sensitive information, like a credit card, can be secured. Inline secure payment systems 1331 secure all calls going to the merchant, but are highly inefficient because they require 100% of call traffic to be first routed into the inline secure payment system when only a small percentage (around 5% to 10%) of calls need secure payments. 90-95% of calls do not need a payment service, but traverse the secure payment system and are potentially compromised when a fault occurs or degradation of the system in the 'in-line' payment system. They do so at a tremendous cost in terms of call bandwidth/overhead for the merchant. All calls to the merchant's call center are made through the merchant's telecom provider 1312. Every call to the merchant's call center is first routed first to the in-line secure payment technology, and then re-routed out to the merchant's on-premise switch (shown in later diagrams). As this re-routing is done for 100% of calls going through the merchant's telecom provider 1312, the merchant pays for twice the call volume than is needed under the solution embodied in FIGS. 1 to 12.

Offline automated IVR payment systems 1332 avoid the inefficiency of securing 100% of calls to the merchant's call center, but the merchant's enterprise is still typically kept in-line and therefore in scope for PCI compliance. These systems also require transferring of the calls that need to be secured to an external, automated interactive voice response (IVR) system to have the customer interact with the IVR unassisted, while the representative waits unproductively until the call is transferred back. The customer cannot be "coached" through the card entry process by the call center as they are no longer in direct conversation, increasing the risk of failed or abandon sales. If the call is dropped during transfer, the customer is lost and unless the customer calls back, the sale is lost. If the customer is unable to complete the payment without agent assistance, the payment cannot be completed and the sale is lost.

The solution embodied in FIGS. 1 to 12 remedies these deficiencies in existing technologies by providing 1) on demand securing of calls, 2) for only that percentage of call traffic for which secure payments are required, 3) for only that portion (part) of the phone call when a payment is being made, 4) for any staff member of the merchant whether or not that staff member is part of the merchant's call center, and 5) while allowing the representative to remain on the line during the call. Neither of the two existing technologies 1330 provides that combination of features, and the two existing technologies 1330 cannot be combined to provide them.

FIG. 14 (PRIOR ART) is a diagram further explaining the limitations of existing in-line payment processing technology for secure call payment solutions. Inline secure payment processing technology 1331 has problems that are solved by the secure payment system described in FIGS. 1-12. There are currently no secure payment solutions which allow merchant representatives who are not call center agents to take secure payments (e.g., a retail shop front staff member taking a deposit payment to put stock aside for a customer).

Further, there are currently no secure payment solutions which allow merchant representatives to secure an unsecured call on demand while staying on the line.

As further detailed in this FIG. 14, inline call securing technologies are only suited to work in highly concentrated calling environments of call center environments. They require securing of all calls going to the merchant to make sure that those call that could contain a sensitive information, like a credit card, can be secured. Inline secure payment systems 1331 secure all calls going from the customer 1410 to the merchant 1440, but are highly inefficient because they require 100% of call traffic to be first routed through the PCI inline technology 1430 when only a small percentage (around 5% to 10%) of calls need secure payments. They do so at a tremendous cost in terms of call volume for the merchant 1440. All calls to the merchant's 1440 call center 1442 are made through the merchant's telecom provider 1420. Every call to the merchant's call center 1442 is first routed to the PCI in-line secure payment technology 1430, and then re-routed out to the merchant's on-premise switch 1443. As this re-routing is done for 100% of calls going through the merchant's telecom provider 1420, the merchant 1440 pays for twice the call volume than is needed under the solution embodied in FIGS. 1 to 12.

As described at 1444, customers 1410 are asked by the merchant's call center agent 1441 to share their card details for payments using a payment processor 1450, which presents a security risk to the business. To reduce this risk, existing PCI technology 1430 sits "in line" between the merchant's telecom 1420 provider and the merchant's on-premise 1443 switch to "listen to" all calls all the time, so that it has visibility of any call which needs to have credit card details removed from the call for PCI compliance purposes as a payment is to be made. As described at 1445, the call center 1442 operated by the merchant 1440 (which may be at the merchant's facility or provided via cloud services) cannot solve this problem. The merchant's 1440 call center agent 1441 must always be on the line with the customer to ensure that the sales process and subsequent payment is successful. This system would therefore contain customer card details, unless masked from the merchant's telephony environment 1440. As described at 1446, the merchant's on-premise switch is in-line between the customer 1410 and the call center agent 1441 and cannot disconnect or the call is lost. All data, including sensitive data, is transmitted through the on-premise switch to the call center, meaning sensitive information is traversing the merchant's IT and voice systems, thus presenting a security risk.

As described at 1431, to remove the sensitive information from the call, the PCI technology is installed 'in-line' between the merchant's telecom provider 1420 and the merchant's telephony environment 1440. It needs to 'listen to' 100% of all calls all the time to ensure it can secure a call that results in card details being shared (which is approximately 5% to 10% of the time). Thus, PCI inline technology is extremely inefficient use and significant over capacity and costs are required. As described at 1421, all calls traverse the merchant's telecom provider 1420 all the time, with the PCI technology vendor requesting, during installation and deployment of the project, for all calls once destined for the merchant's call center 1442 to be instead rerouted to the PCI inline technology 1430. All calls are routed into the PCI inline technology 1430 first, then re-routed back to the merchant's on-premise switch 1443. This doubles the amount of call volume a merchant 1440 needs to purchase from the merchant's telecom provider 1420.

The solution embodied in FIGS. 1 to 12 remedies these deficiencies in existing technologies by providing 1) on demand securing of calls, 2) for only that percentage of call traffic for which secure payments are required, 3) for only that percentage (part) of the phone call when a payment is being made, 4) for any staff member of the merchant whether or not that staff member is part of the merchant's call center, and 5) while allowing the representative to remain on the line during the call. Neither of the two existing technologies 1330 provides that combination of features, and the two existing technologies 1330 cannot be combined to provide them.

FIG. 15 (PRIOR ART) is a diagram further explaining the limitations of existing offline automated IVR payment processing technology for secure call payment solutions. Offline automated IVR payment processing technology 1332 has problems that are solved by the secure payment system described in FIGS. 1-12. There are currently no secure payment solutions which allow merchant representatives who are not call center agents to take secure payments (e.g., a retail shop front staff member taking a deposit payment to put stock aside for a customer). Further, there are currently no secure payment solutions which allow merchant representatives to secure an unsecured call on demand while staying on the line.

As further detailed in this FIG. 15, offline automated IVR payment systems avoid the inefficiency of securing 100% of calls to the merchant's 1540 call center 1542, but require transferring of the calls that need to be secured to an external, automated interactive voice response (IVR) system 1530 to have the customer 1510 interact with the IVR 1530 unassisted while the call center agent 1542 waits unproductively until the call is transferred back. The customer 1510 cannot be "coached" through the card entry process by the call center agent 1542, increasing the risk of failed or abandon sales. If the call is dropped during transfer, the customer 1510 is lost and unless the customer calls back, the sale is lost. If the customer 1510 is unable to complete the payment without agent assistance, the payment cannot be completed and the sale is lost.

As described at 1544, the call center agent 1541 is excluded from the payment call line to meet PCI security requirements, but cannot assist customer 1510 with payment or re-establish communications with customer 1510 until after customer 1510 completes the payment. The call center agent cannot recover dropped calls that occur during transfers. As described at 1545, the call center's only option to secure calls on an "an-needed" basis is to instruct the on-premise switch 1543 to transfer the customer call to an external, independent IVR payment service (dotted lines) 1530 for the customer 1510 to transact with the payment processor 1550. The call center agent 1541 cannot be on the line to assist customer with payment. Transferring of call back and forth from original line (solid lines) to external call line (dotted lines) risks dropped calls. As described at 1511, the call is transferred to an external IVR processor 1530 via an external line (dotted lines), allowing the customer 1510 to enter card details for the payment processor 1550, but the call center agent 1541 cannot be on the call to assist the customer 1510 and waits unproductively for the customer to complete the payment using the external IVR processor 1530.

Thus, transferring the customer 1510 to an external IVR payment service 1530 removes the security risk, but introduces a risk of dropped calls or having the customer 1510 hang up during the payment operation. As the call center agent 1541 is no longer on the line to assist customer 1510 with the payment, the risk increases the chances that the customer 1510 will fail to enter his or her credit card details successfully and hang up. In addition, the call center agent 1541 must remain in reserve, waiting for the call to be returned, which is very inefficient.

The solution embodied in FIGS. 1 to 12 remedies these deficiencies in existing technologies by providing 1) on demand securing of calls, 2) for only that percentage of call traffic for which secure payments are required, 3) for only that percentage (part) of the phone call when a payment is being made, 4) for any representative of the merchant whether or not that representative is part of the merchant's call center, and 5) while allowing the representative to remain on the line during the call. Neither of the two existing technologies 1330 provides that combination of features, and the two existing technologies 1330 cannot be combined to provide them.

FIG. 16 is a diagram which provides additional context for the on-demand secure data entry system and method for representative-assisted transactions described in FIGS. 1-12. The solution embodied in FIGS. 1 to 12 remedies the deficiencies in existing technologies 1330 by providing 1) on demand securing of calls, 2) for only that percentage of call traffic for which secure payments are required, 3) for only that percentage (part) of the phone call when a payment is being made, 4) for any representative of the merchant whether or not that representative is part of the merchant's call center, and 5) while allowing the representative to remain on the line during the call. Neither of the two existing technologies 1330 provides that combination of features, and the two existing technologies 1330 cannot be combined to provide them.

In this diagram, solid lines are used to represent the customer's original call and the call controls, dashed lines are used to the customer leg (Call A) established via the DMTF secure call platform 330, and dotted lines are used to represent the representative leg (Call B) established via the DTMF secure call platform 330.

Here, the customer 110 initiates an original call to a representative 120 of the merchant 150 through the merchant's telecom provider 140. The representative 120 may be any staff member of merchant 150, including but not limited to a call center agent 153 and a non-call-center staff member 155. The original call may pass through an on-premise switch 154 at the merchant's 150 facility. The original call may be either to one of the merchant's call center agents 153 or to a non-call-center merchant staff member 155. For clarity, the descriptions herein will assume a call to the merchant's call center agent 153, but the same technology applies to any merchant representative 120 whether a call center agent 153 or a non-call-center merchant staff member 155, all as previously described in FIGS. 1 to 12.

The original call is not secured for call payments. However, if a secure payment is required during the original call, for example when the merchant's call center agent 153 requests payment information from customer 110 to make a payment for goods or services, the call center agent 153 clicks a button on the screen to secure communications which sends a message via internal message microservice 210 (shown in earlier diagrams) to the PCI message microservice 310 (shown in earlier diagrams). In this exemplary diagram, the merchant's call center agent 153 initiates a secure call request via a payment terminal web session 152 on the agent's computer which is transferred via internal message microservice 210 (shown in earlier diagrams). This starts a process of securing the call via a DTMF secure call platform 330 which allows customer 110 to enter data in a secure manner which is masked from the call center agent 153 even while the call center agent 153 remains on the call and available to speak with customer 110.

The secure call request is passed by internal message service 210 (shown in earlier diagrams) to a payment terminal hosted web page 222 hosted by a session worker 220 of the PCI compliant zone 300. After the secure call request is received by the session worker 220, it sends the secure call request to the PCI message service 310 (shown in earlier diagrams) of PCI compliant zone 300 which passes the messages within PCI compliant zone 300 for establishment of via the DTMF secure call platform 330 for establishment of the customer leg (Call A) and representative leg (Call B), and bridging of the two calls (Call A & Call B) according to the methodologies described in FIGS. 1 to 12. Upon receipt of the secure call request at DTMF secure call platform, the session border controller (SBC) 340 is responsible for securing VOIP calls within PCI compliant zone 300 border and for directing telephony sessions from carriers to the appropriate softswitches (softswitch A 320a and softswitch B 320b) for securing and bridging using appropriate DTMF secure call spaces (DTMF secure call space A 330a and DTMF secure call space B 330b) all according to the methodologies described in FIGS. 1 to 12.

The DTMF secure call platform 330 sends call controls to APIs 141 of the merchant's telecom provider 140 with instructions to establish customer leg (Call A) and representative leg (Call B), bridge them, and to mask DTMF and voice-based credit card information on the customer leg (Call A) from being transmitted to the representative leg (Call B). The APIs 141 provide access to third-party control features made available by the telecom provider by allowing third-party control of low-level switches at the merchant's telecom provider 140. Via a series of API 141 calls, low-level switches at the telecom provider are instructed to to place the call on hold, make new calls, bridge them, and mask the appropriate information. The reason this is done using low-level switches at the merchant's telecom provider 140 is that by using such low-level switches the calls can be bridged outside of the Merchant environment (150) while still meeting the required PCI-DSS compliant call flow without having the original call dropped. Neither of the existing technologies described in FIGS. 13 to 15 can accomplish this on-demand.

Once customer leg (Call A) and representative leg (Call B) are made, bridged, and masked, the Customer (110) can enter credit card information on Call A using the touch tone key pad of the telephone that they are talking to the representative with for processing by a payment processor 160 without having the credit card information transmitted to the agent 153 on Call B. In other words, even though the calls are bridged and the agent and customer can hear each other throughout the process, credit card information from Call A is masked from Call B by the DTMF secure call spaces 330a and 330b).

Note that while the customer call is shown in this example as being placed on a regular phone line via a PSTN, no limitation is implied thereby, and the call may be placed through other available means or technologies (e.g., voice-over-Internet-protocol (VOIP), cellular phone service, etc.).

FIG. 17 is a diagram which describes a primary use case for the on-demand secure data entry system and method for representative-assisted transactions described in FIGS. 1-12.

A primary use case for the secure data entry system and method herein described is for facilitation of customer payments to merchants via a representative of the merchant wherein 1) on demand securing of calls, 2) for only that percentage of call traffic for which secure payments are required, 3) for only that percentage (part) of the phone call when a payment is being made, 4) for any staff member of the merchant whether or not that staff member is part of the merchant's call center, and 5) while allowing the representative to remain on the line during the call. The secure data entry system and method herein described allows for businesses to securely take credit card based payments using a Unified Communications as a Service (UCaaS), Hosted PBX, Cloud VOIP, IMS, Mobile Network extension in office settings, service desk and retail hospitality, local government point of sale transactions. UCaaS is the modern form of the plain old telephone service (POTS) and allows for software-based call handling as described herein. The application of the system and method herein described allow for new, just-in-time business processes that make customer-merchant transactions faster and more efficient while simultaneously improving data security.

As detailed in FIGS. 13-16, existing technologies either require 100% of calls to be routed through a PCI inline technology 1731 or require the customer to be transferred to an external automated call IVR system 1722. This diagram shows a technology comparison table 1710 having two axes, type of call 1720 and call routing efficiency 1730. The type of call axis 1720 is sub-divided into two types, assisted calls 1721 and automated (non-assisted) calls 1722, with sales revenues increasing 1723 in assisted calls 1721. The call routing efficiency axis 1730 is sub-divided into two types, all calls 1731 and only calls requiring payment 1732, with economic efficiency increasing 1733 where only calls requiring payment are routed for securing 1732. This results in and four quadrants 1711-1714 corresponding to the capabilities of different methods of securing call payments, a not-applicable quadrant 1713 which is not used by any call securing technology, two quadrants 1711, 1714 corresponding to existing technologies, and one quadrant 1712 corresponding to the new technology described in this application.

In quadrant 1711, using PCI inline technology, an agent of a contact center provider 1711 can remain on the call to assist with the payment 1721, but all calls must be routed through the PCI inline system 1731 resulting in the merchant paying for twice the call volume (as described above). This existing technology is inefficient and results in 90+% wasted overhead due to doubling of the merchant's call volume through the merchant's telecom provider. This existing technology can only be performed through a contact center.

There is no existing technology for providing secure call payments to merchant staff occurring in a non-call-center environment.

In quadrant 1714, using an external automated IVR, only calls that require payment are routed for securing 1732, but the agent of the contact center provider 1714 is excluded from the call and cannot be present to assist the customer with the payment 1722. These two quadrants 1711 and 1714 are mutually exclusive, so the quadrant 1713 is not applicable. This existing technology requires the agent to wait unproductively while the customer uses the external IVR and risks dropped calls and failed payments. This existing technology results, on average, in 9% loss of sales and 20% loss in debt recoveries. This existing technology can only be performed through a contact center. There is no existing technology for providing secure call payments to merchant staff occurring in a non-call-center environment.

Quadrant 1712 represents the new technology described in this patent application. This technology results in improvements over existing technology as described at 1740, which are that 1) on demand securing of calls, 2) for only that percentage of call traffic for which secure payments are required, 3) for only that percentage (part) of the phone call when a payment is being made, 4) for any staff member of the merchant whether or not that staff member is part of the merchant's call center, and 5) while allowing the representative to remain on the line during the call. This quadrant maximizes both increasing sales revenue 1723 and increasing economic benefit due to efficiency 1733.

Figure 18:
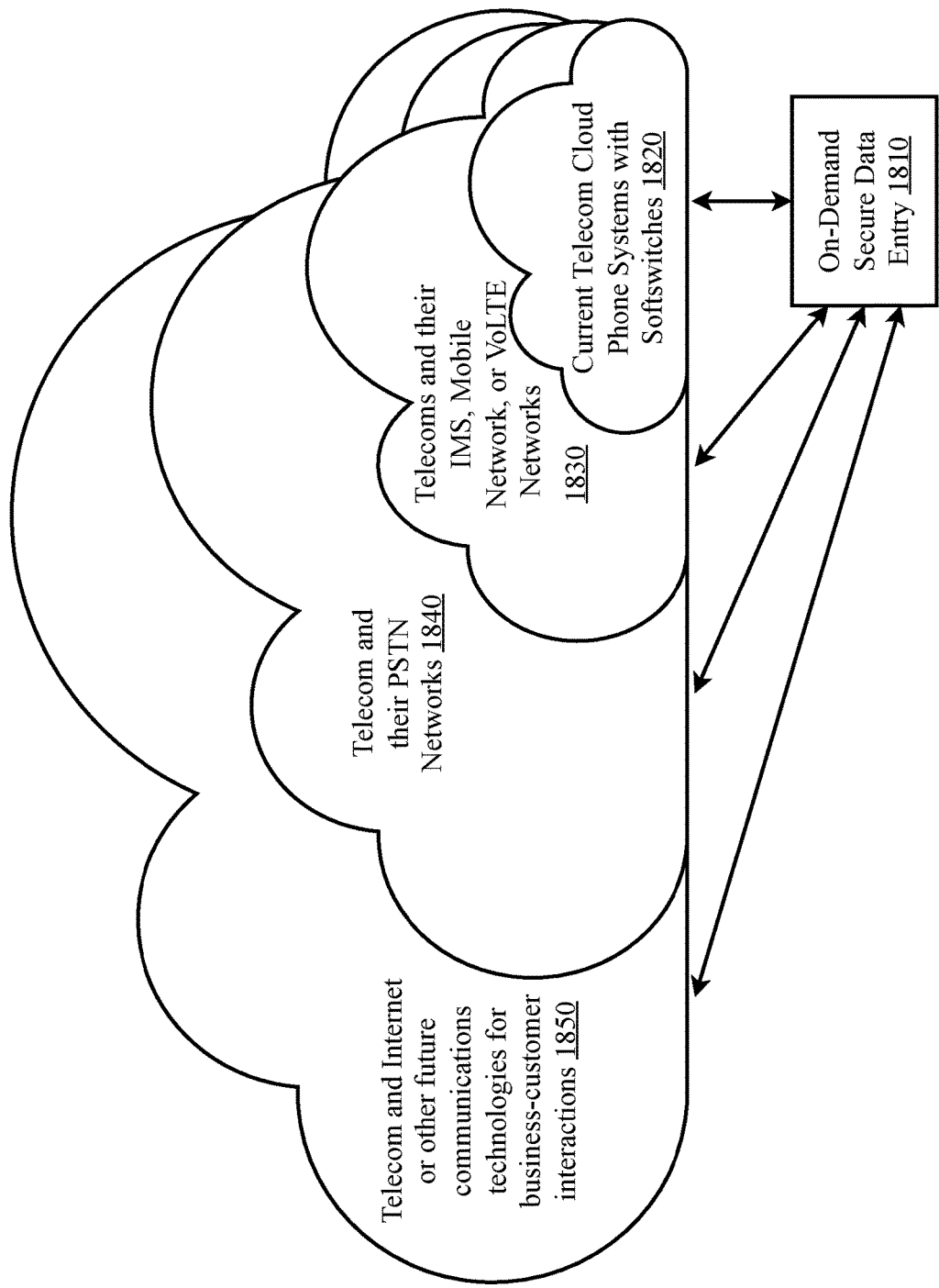
FIG. 18 is a diagram which describes extension of the on-demand secure data entry system and method for representative-assisted transactions technology described in FIGS. 1-12 to broader networks and future technologies.

FIG. 18 is a diagram which describes extension of the on-demand secure data entry system and method for representative-assisted transactions technology described in FIGS. 1-12 to broader networks and future technologies. Because of its use of APIs to control low-level switches at the telecom provider level, the on-demand secure data entry technology 1810 described herein can, with little modification, be applied not only to telecom cloud phone systems with softswitches 1820, but also to any telecom system having low-level soft switches controllable by APIs, including but not limited to telecoms and their initiation protocol multimedia subsystems (IMS), mobile networks, and voice over long term evolution (VOLTE) networks 1830, telecoms and their public switching telephone networks (PSTN) 1840, and any other Internet-based or future communication technologies allowing for remote control of telecom softswitches 1850 having functionality similar to current low-level telecom softswitches.

Exemplary Computing Environment

Figure 19:
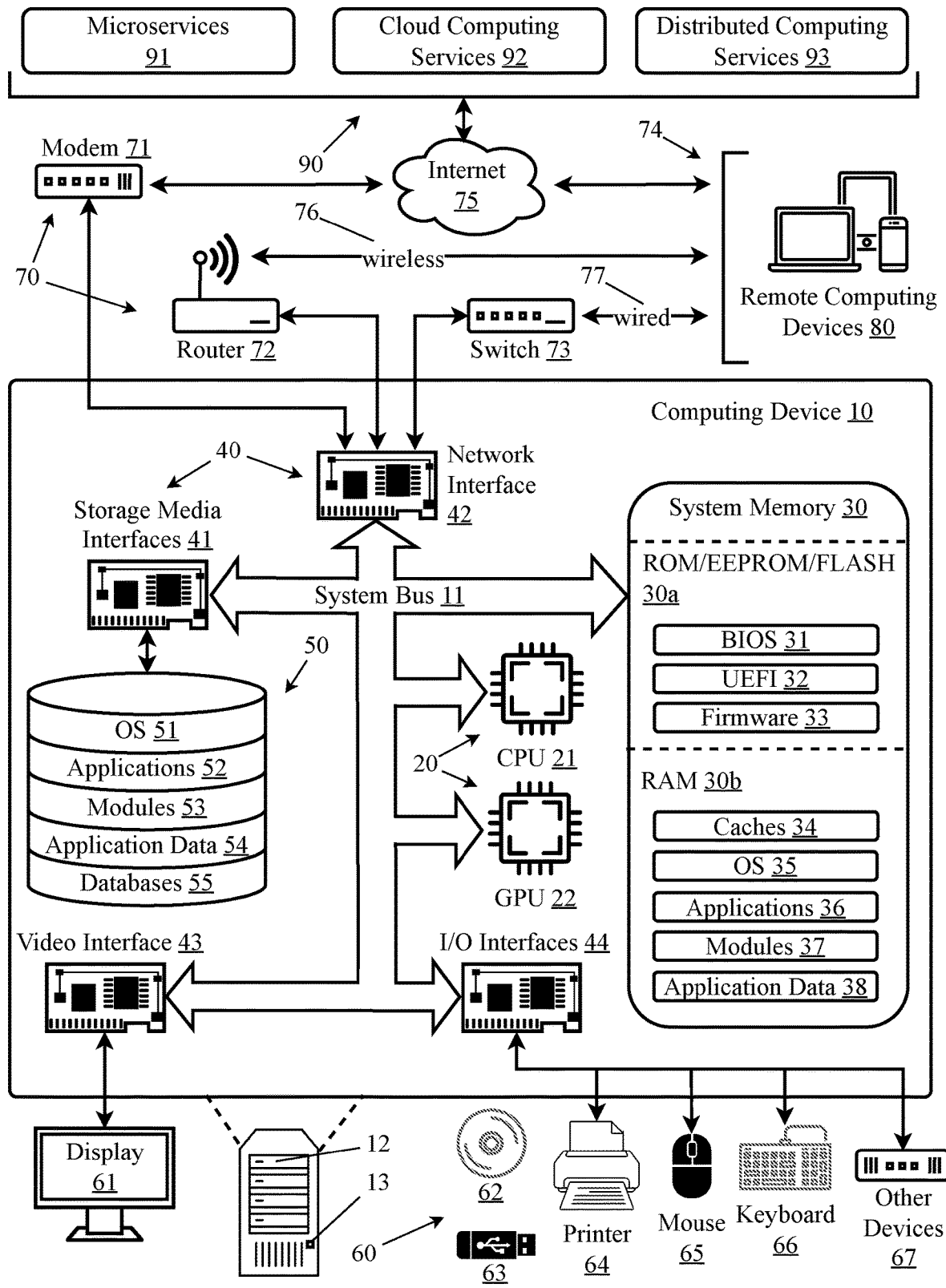
FIG. 19 illustrates an exemplary computing environment on which an embodiment described herein may be implemented.

FIG. 19 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IOT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for on-demand secure data entry for representative-assisted calls, comprising:
    a computer system comprising a memory, a processor, and a non-volatile data storage device;
    a messaging broker operating on the computer system, the messaging broker comprising a first plurality of programming instructions stored in the memory which, when operating on the processor, causes the computer system to coordinate the operation of a plurality of microservices via messaging, each of the microservices comprising a cloud-based service providing telephony functionality, and wherein the plurality of microservices comprises:
        a session worker microservice providing the following telephony functionality:
            during an unsecured call between a customer and merchant representative via a telephony system of the merchant's telecommunications carrier occurring in non-call center environments controlled by the merchant, receive a request to establish a secured, connected call wherein the customer and the merchant representative remain in voice communication with one another while payment information provided by customer is masked from the merchant representative; and
            instruct a dual-tone multi-frequency (DTMF) secure call platform to establish the secured, connected call via a series of API calls to third-party control features of the telephony system of the merchant's telecommunications carrier; and
        the dual-tone multi-frequency (DTMF) secure call microservice, the DTMF secure call microservice providing the following telephony functionality:
            receive the instructions to establish the secured, connected call and the phone number allocation from the session worker;
            via a series of API calls to the telephony system of the merchant's telecommunications carrier, instruct the telephony system to:
                park or hold the customer-to-representative call;
                place a representative-to-system call to a dialed number identification service (DNIS) phone number through the softswitch;
                transfer the held customer-to-representative call to the DNIS phone number to connect the customer-to-system; and
                connect the representative-to-system call and the customer-to-system call via the phone number;
            secure the representative-to-system call after receipt of validation of the system-to-representative call using a first DTMF secure call space;
            secure the customer-to-system call after receipt of validation of the system-to-customer call using a second DTMF secure call space;
            receive one or more dual-tone multi-frequency (DTMF) tones representing digits from zero to nine from the customer-to-system call; and
            using the first DTMF secure call space and second DTMF secure call space, block transmission of the DTMF tones to the representative-to-system call while passing through any other audio from the customer-to-system call to the representative-to-system-call.

2. The system of claim 1, wherein the DTMF secure call microservice is further configured to:
    decrypt the received DTMF tones into the digits they represent;
    add the digits to a field; and
    transmit the field to a payment worker for processing by a secure payment application.

3. The system of claim 2, wherein the DTMF secure call microservice is further configured to:
    mask one or more of the digits in the field; and
    transmit the field with the masked digits to a representative interface via the representative-to-system call.

4. The system of claim 2, further comprising the representative interface operating on a second computing device which is configured to receive and display the field with the masked digits.

5. The system of claim 2, further comprising a secure border controller (SBC) microservice operating in the PCI compliant zone wherein the SBC acts as a call gateway securing a payment card industry (PCI) compliant zone.

6. A method for on-demand secure data entry for representative-assisted calls, comprising the steps of:
    using a messaging broker operating on a computer system comprising a memory and a processor to coordinate the operation of a plurality of microservices via messaging, each of the microservices comprising a cloud-based service providing telephony functionality, wherein:
        the messaging broker is used to instruct a session worker microservice to provide the following telephony functionality:
            during an unsecured call between a customer and merchant representative via a telephony system of the merchant's telecommunications carrier, receive a request to establish a secured, connected call wherein the customer and the merchant representative remain in voice communication with one another while payment information provided by customer is masked from the merchant representative; and instruct a dual-tone multi-frequency (DTMF) secure call platform to establish the secured, connected call via a series of API calls to the telephony system of the merchant's telecommunications carrier; and the messaging broker is used to instruct the dual-tone multi-frequency (DTMF) secure call microservice, the DTMF secure call microservice to provide the following telephony functionality:

receive the instructions to establish the secured, connected call and the phone number allocation from the session worker;

via a series of API calls to the telephony system of the merchant's telecommunications carrier, instruct the telephony system to:

park or hold the customer-to-representative call;

place a representative-to-system call between a dialed number identification service (DNIS) phone number through the softswitch;

transfer the held customer-to-representative call to the DNIS phone number to connect the customer-to-system; and connect the representative-to-system call and the customer-to-system call via the phone number;

secure the representative-to-system call after receipt of validation of the representative-to-system call using a first DTMF secure call space;

secure the customer-to-system call after receipt of validation of the customer-to-system call using a second DTMF secure call space;

receive one or more dual-tone multi-frequency (DTMF) tones representing digits from zero to nine from the customer-to-system call; and using the first DTMF secure call space and second DTMF secure call space, block transmission of the DTMF tones to the representative-to-system call while passing through any other audio from the customer-to-system call to the system-to-representative call.

7. The method of claim 6, further comprising the step of using the DTMF secure call microservice to:

decrypt the received DTMF tones into the digits they represent;

add the digits to a field; and transmit the field to a payment worker for processing by a secure payment application.

8. The method of claim 7, further comprising the step of using the DTMF secure call microservice to:

mask one or more of the digits in the field; and transmit the field with the masked digits to a representative interface via the representative-to-system call.

9. The method of claim 7, further comprising the steps of receiving and displaying the field with the masked digits on the representative interface which is operating on a second computing device.

10. The method of claim 7, further comprising the step of using a secure border controller (SBC) microservice operating in the PCI compliant zone as a call gateway securing payment card industry (PCI) compliant zone.

\* \* \* \* \*